US012634189B2

(12) United States Patent
Yang et al.

(10) Patent No.: US 12,634,189 B2
(45) Date of Patent: May 19, 2026

(54) DEMODULATION FOR PROBABILISTIC AMPLITUDE SHAPED SIGNAL

(71) Applicant: QUALCOMM Incorporated, San Diego, CA (US)

(72) Inventors: Wei Yang, San Diego, CA (US); Mahmoud Taherzadeh Boroujeni, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 18/415,386

(22) Filed: Jan. 17, 2024

(65) Prior Publication Data

US 2025/0233790 A1     Jul. 17, 2025

(51) Int. Cl.
*H04L 27/38*      (2006.01)
*H04L 27/34*      (2006.01)

(52) U.S. Cl.
CPC ...... *H04L 27/3809* (2013.01); *H04L 27/3405* (2013.01)

(58) Field of Classification Search
CPC ........................ H04L 27/3809; H04L 27/3405
See application file for complete search history.

(56) References Cited

U.S. PATENT DOCUMENTS

| | | | | |
|---|---|---|---|---|
| 10,236,991 B2 * | 3/2019 | Yu | ..................... | H04L 27/26526 |
| 10,601,517 B1 * | 3/2020 | Kim | .................. | H03M 13/6522 |
| 10,785,085 B2 * | 9/2020 | Jardel | ................... | H04L 1/0009 |
| 2020/0287756 A1 * | 9/2020 | Razzetti | ............... | H04L 1/0042 |
| 2024/0137261 A1 * | 4/2024 | Wu | ....................... | H04L 5/0091 |

* cited by examiner

*Primary Examiner* — Freshteh N Aghdam
(74) *Attorney, Agent, or Firm* — QUALCOMM Incorporated

(57) ABSTRACT

The apparatus may be an apparatus for wireless communication at a decoding device, for decoding a probabilistically-shaped quadrature amplitude modulation (QAM) signal associated with a phase modulation and an amplitude modulation. The apparatus may be configured to receive, in association with the probabilistically-shaped QAM signal, at least one symbol associated with a first amplitude and demodulate the at least one symbol based on a distance-based demodulation calculation that is adjusted based on a Maxwell-Boltzmann distribution.

30 Claims, 13 Drawing Sheets

1100

1102 — receive, in association with a probabilistically-shaped QAM signal, at least one symbol associated with a first amplitude 1104 — adjust the amplitude of the set of QAM constellation points 1106 — demodulate the at least one symbol based on a distance-based demodulation calculation that is adjusted based on a Maxwell Boltzmann (MB) distribution 1107 — calculate a distance between a received symbol and at least one potential demodulated symbol 1108 — output the demodulated at least one symbol for at least one of local storage or transmission to an additional device

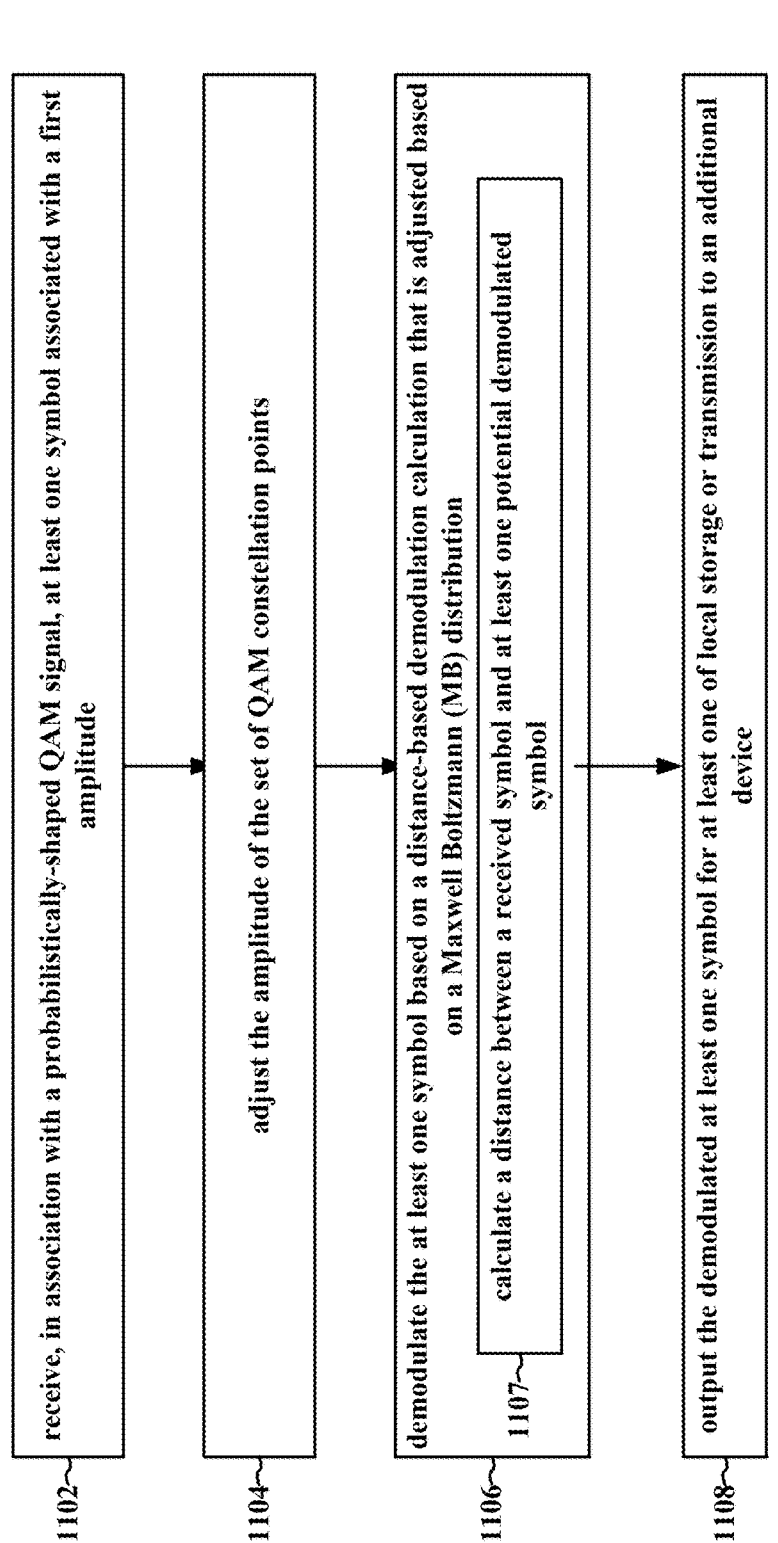

1102 — receive, in association with a probabilistically-shaped QAM signal, at least one symbol associated with a first amplitude 1104 — adjust the amplitude of the set of QAM constellation points 1106 — demodulate the at least one symbol based on a distance-based demodulation calculation that is adjusted based on a Maxwell Boltzmann (MB) distribution 1107 — calculate a distance between a received symbol and at least one potential demodulated symbol 1108 — output the demodulated at least one symbol for at least one of local storage or transmission to an additional device

DEMODULATION FOR PROBABILISTIC AMPLITUDE SHAPED SIGNAL

TECHNICAL FIELD

The present disclosure relates generally to communication systems, and more particularly, to demodulation of wireless communication associated with quadrature amplitude modulation (QAM).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device configured to receive, in association with the probabilistically-shaped signal, at least one symbol associated with a detected amplitude and a detected phase and demodulate the at least one symbol based on a distance-based demodulation calculation that is adjusted based on a Maxwell Boltzmann (MB) distribution.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

DETAILED DESCRIPTION

Figure 1:
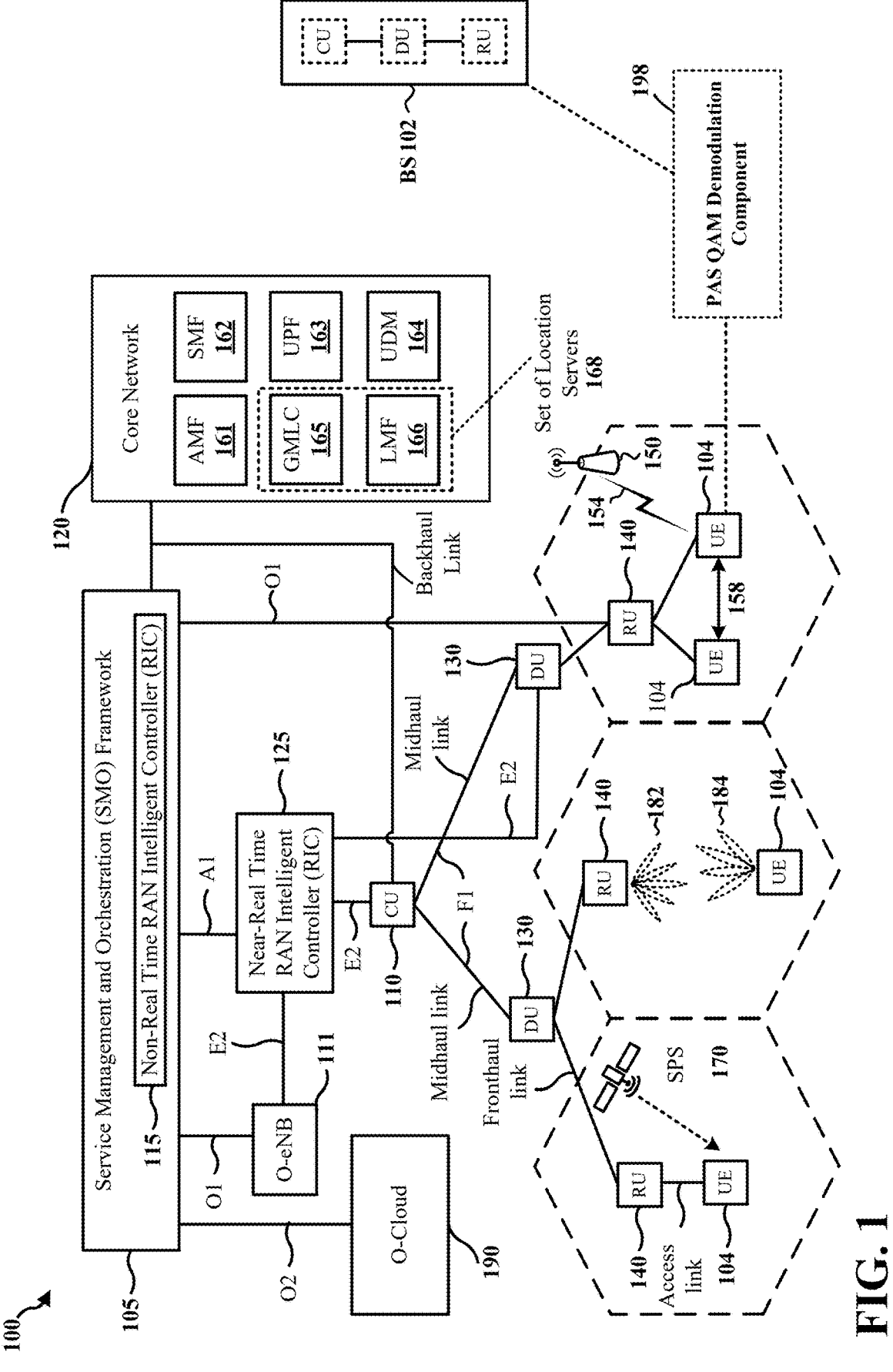
FIG. 1 is a diagram illustrating an example of a wireless communications system and an access network.

In some aspects of wireless communication, a wireless communication may be a quadrature amplitude modulated (QAM) signal. A QAM signal may be associated with a set of constellation points that may be visualized as points in a two-dimensional plane with a first axis associated with an amplitude of the constellation point and a second axis associated with a phase of the constellation point. In some aspects of wireless, constellation points of a QAM signal may be used with a uniform (or approximately uniform) probability. However, in some aspects, a probabilistically shaped (PS) constellation in which each constellation point is used with a known probability may improve a performance (e.g., an achievable information rate) associated with a QAM signal. In some aspects, the probabilistic shaping may be based on constant-composition distribution matching and a Maxwell-Boltzmann distribution (e.g., a distribution for which a probability p(x) is approximately equal to $e^{-v|x|^2}$). The probabilistic shaping, in some aspects, may be applied to single-input and single-output (SISO) or multiple-input and multiple-output (MIMO) transmissions.

Various aspects relate generally to a demodulation method for probabilistic-amplitude-shaped (PAS) SISO/MIMO signals. Some aspects more specifically relate to demodulating a MIMO PS signals using an input scaling to a channel and received signal prior to performing additional operations associated with a demodulation. In some examples, a wireless device (e.g., a UE) may receive, in association with the probabilistically-shaped (e.g., QAM) signal, at least one symbol associated with a detected amplitude and a detected phase and demodulate the at least one symbol based on a distance-based demodulation calculation that is adjusted based on a Maxwell-Boltzmann distribution.

Particular aspects of the subject matter described in this disclosure can be implemented to realize one or more of the following potential advantages. In some examples, by using an input scaling to a channel and received signal prior to performing additional operations associated with a demodulation, the described techniques can be used to reduce a decoding complexity using a decoding hardware for non-shaped constellation decoding.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a PAS QAM demodulation component 198 that may be configured to receive, in association with the probabilistically-shaped signal, at least one symbol associated with a detected amplitude and a detected phase and demodulate the at least one symbol based on a distance-based demodulation calculation that is adjusted based on a Maxwell-Boltzmann distribution. Although the following description may be focused on 5G NR, the concepts described herein may be applicable to other similar areas, such as LTE, LTE-A, CDMA, GSM, and other wireless technologies.

Figures 2A, 2B, 2C, 2D:
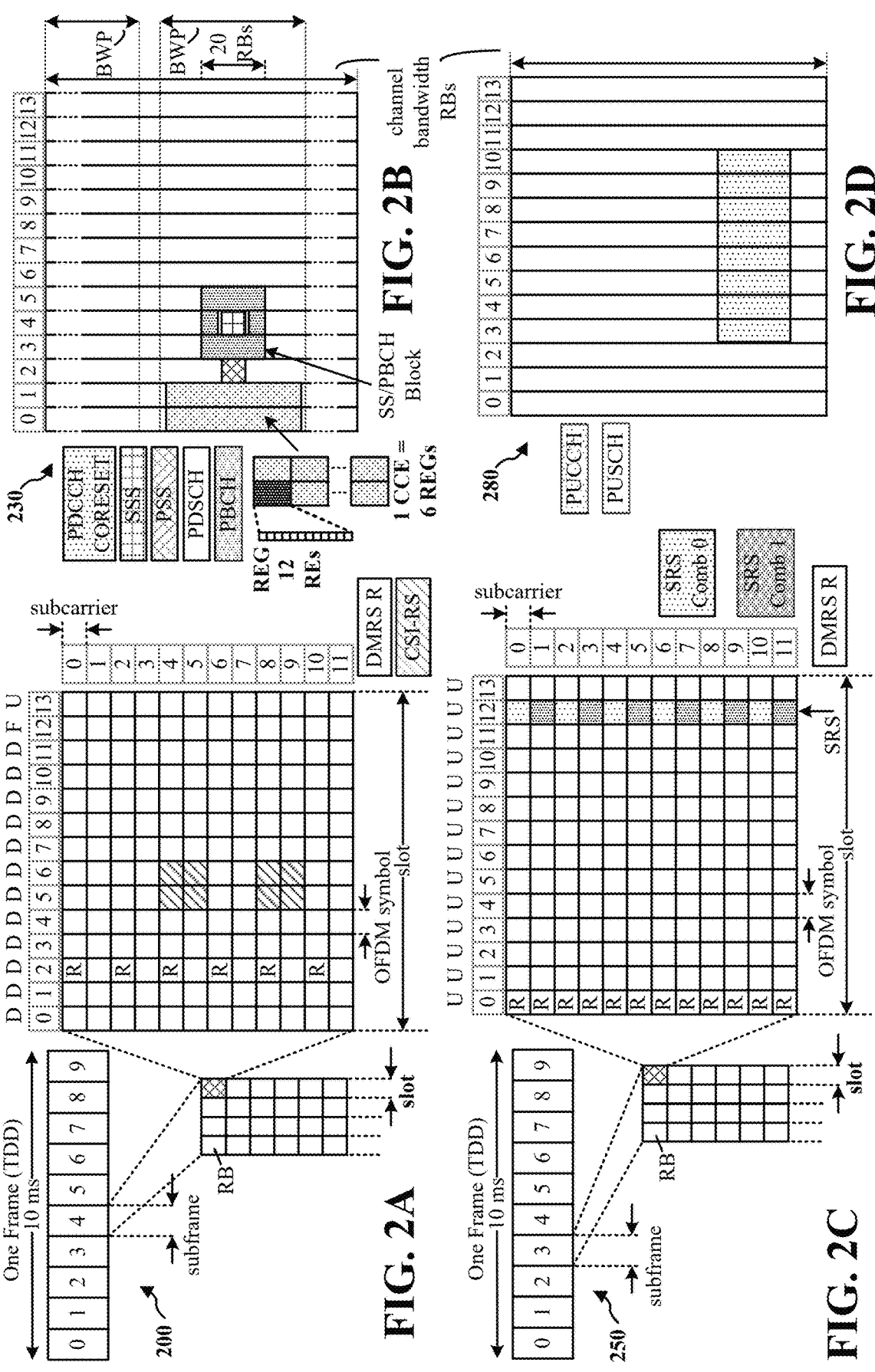
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS<br>$\Delta f = 2^\mu \cdot 15$ [kHz] | Cyclic prefix |
| 0 | 15 | Normal |
| 1 | 30 | Normal |
| 2 | 60 | Normal,<br>Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
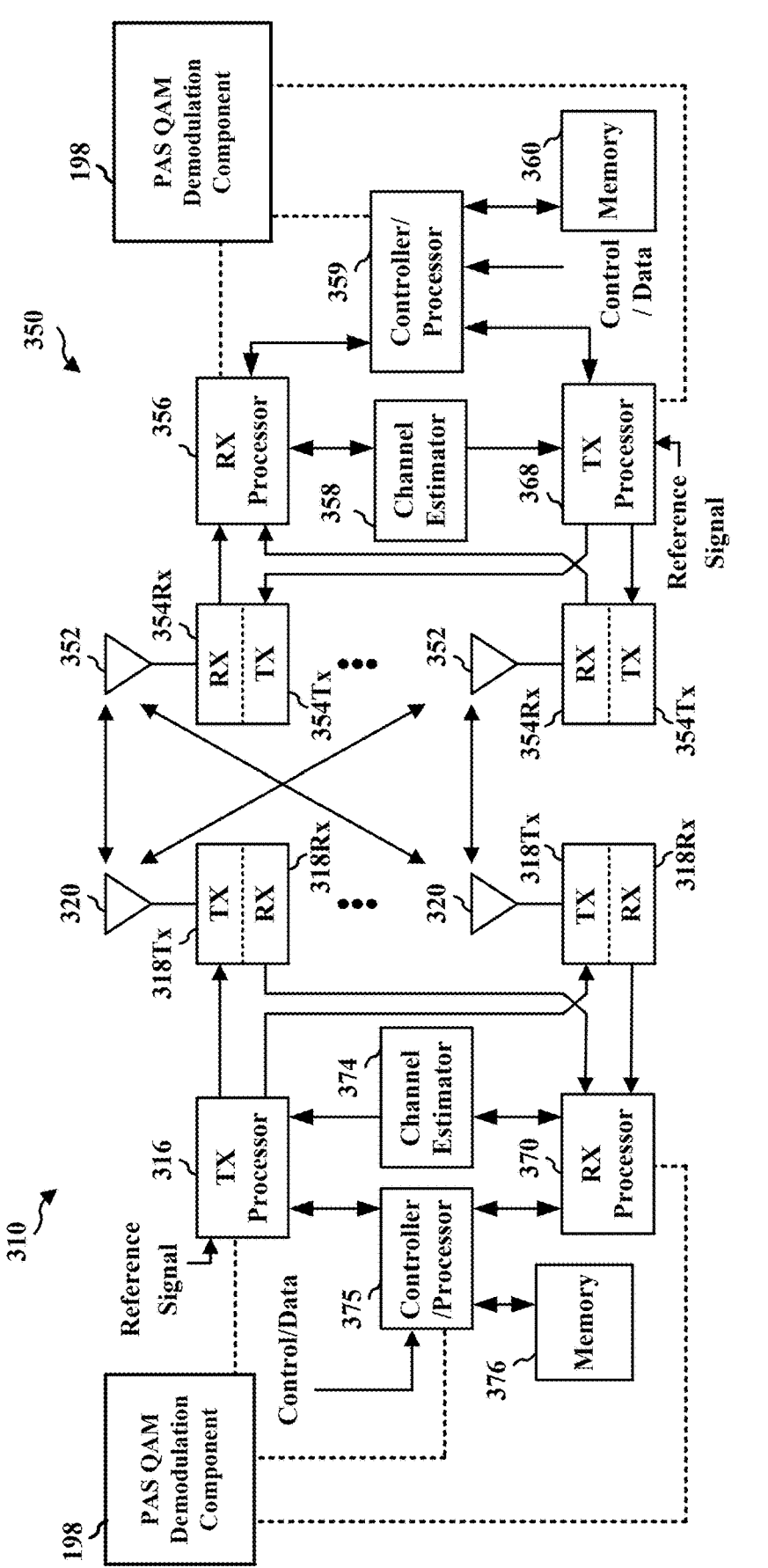
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PAS QAM demodulation component 198 of FIG. 1.

In some aspects of wireless communication, a wireless communication may be a QAM signal. A QAM signal may be associated with a set of constellation points that may be visualized as points in a two-dimensional plane with a first axis associated with an amplitude of the constellation point and a second axis associated with a phase of the constellation point. In some aspects of wireless, constellation points of a QAM signal may be used with a uniform (or approximately uniform) probability. However, in some aspects, a PS or PAS constellation in which each constellation point is used with a known probability may improve a performance (e.g., an achievable information rate) associated with a QAM signal. In some aspects, the probabilistic shaping may be based on constant-composition distribution matching and a Maxwell-Boltzmann distribution (e.g., a distribution for which a probability p(x) is approximately equal to $e^{-\nu|x|^2}$ where x is associated with an amplitude of the QAM constellation point). The probabilistic shaping, in some aspects, may be applied to SISO or MIMO transmissions.

Figure 4:
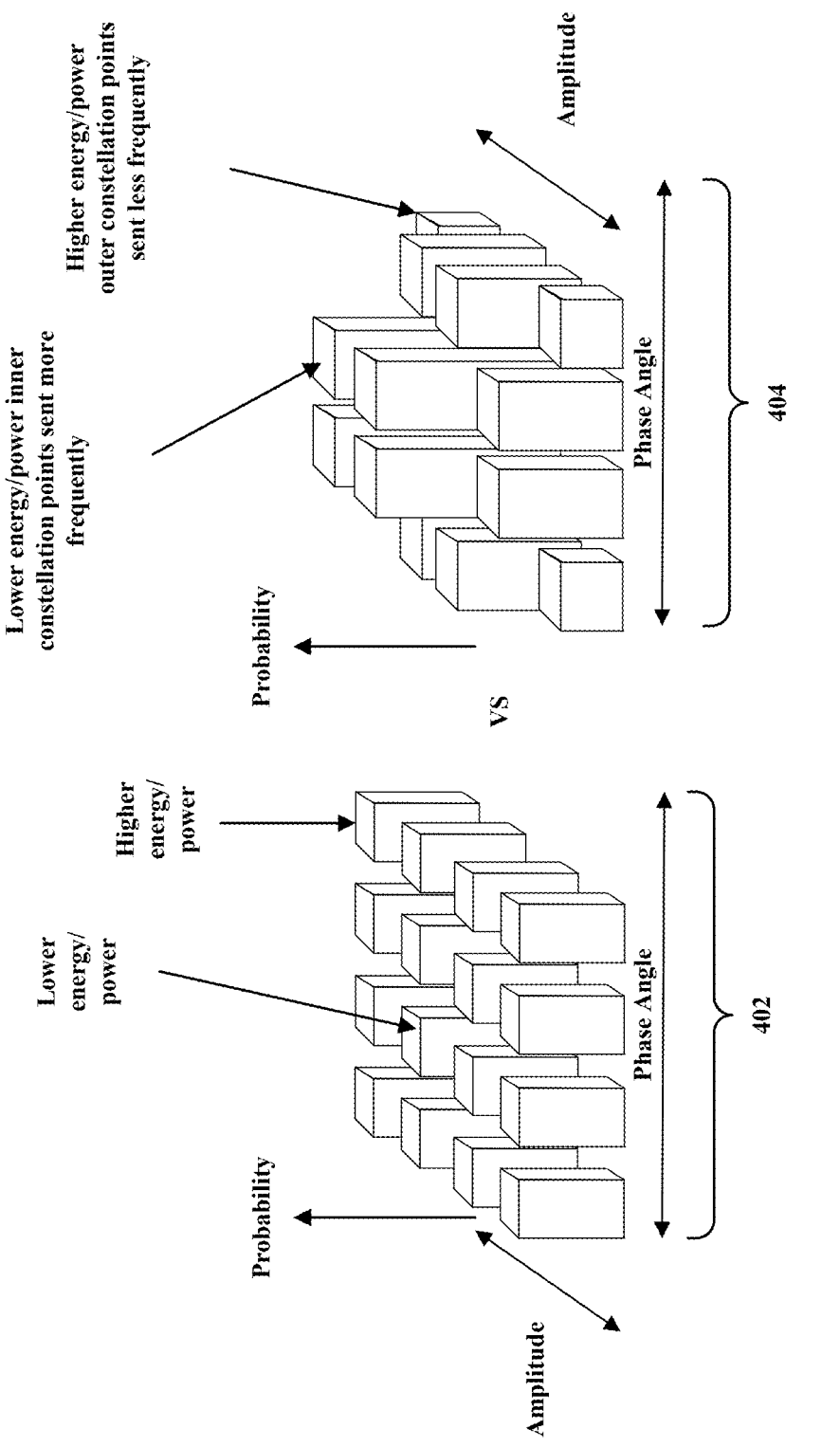
FIG. 4 is a diagram illustrating a first (unshaped and/or uniform) probability distribution among points in a constellation associated with a QAM signal and a second (shaped) probability distribution among the points in the constellation associated with the QAM signal in accordance with some aspects of the disclosure.

FIG. 4 is a diagram 400 illustrating a first (unshaped and/or uniform) probability distribution 402 among points in a constellation associated with a QAM and a second (shaped) probability distribution 404 among the points in the constellation associated with the QAM in accordance with some aspects of the disclosure. As shown, the probability of lower-energy points in the constellation may be increased while the probability of higher-energy points in the constellation may be decreased. In some aspects, the modified probability may be associated with a Maxwell-Boltzmann distribution (e.g., $p(x) \sim e^{-\nu|x|^2}$) or a distribution that may be approximated by a Maxwell-Boltzmann distribution.

In MIMO, a received signal (y) may be represented as y=Hx+n, where H represents a channel, x represents a transmitted signal (transmitted by multiple antenna), and n represents a noise (e.g., an AWGN). In the MIMO case, both the signal and interference layers may be shaped using PS and/or PAS. In some aspects, a same shaping (e.g., PS and/or PAS) may be assumed to be performed, or applied, across all layers. In some aspects, a linear minimum mean square error (LMMSE) demodulator may be applied to (or used to demodulate) a received signal (y) treating interference as Gaussian noise and assuming a same mean and variance for PS and uniform QAM interference. The LMMSE demodulator, in some aspects, may effectively reduce the demodulation to a single layer case (e.g., with a different SINR). In some aspects, a non-linear demodulator may be applied to (or used to demodulate) a received signal. The non-linear demodulator, in some aspects, may exploit the structure of one or more interference layers to improve the demodulation performance and, for a PS received signal, may incorporate the known non-uniform probability distribution for the signal and interference in the demodulator.

The whole MIMO constellation (combination of all N layers) after the effect of channel matrix, in some aspects, may be considered to be points from a 2N-dimensional lattice (which depends on the channel matrix H). In some aspects, for any realization of the channel matrix H, the problem of maximum likelihood MIMO decoding for a uniform QAM may be equivalent to finding a nearest point to a received MIMO constellation point in that 2N-dimensional lattice MIMO constellation. For example, without considering the boundary of the constellation, a demodulation may be related to finding the nearest lattice point to the received MIMO constellation point. In some aspects, methods such as a sphere decoder can be used for exact lattice decoding, however, even exact lattice decoding that ignores the effect of the constellation boundary may have some loss compared to maximum likelihood decoding because of ignoring the constellation boundary. On the other hand, the sphere decoding may achieve an optimum receive diversity and a complexity of lattice decoding scales well with the size of the constellation per dimension (which is good for larger modulation orders).

Figure 5:
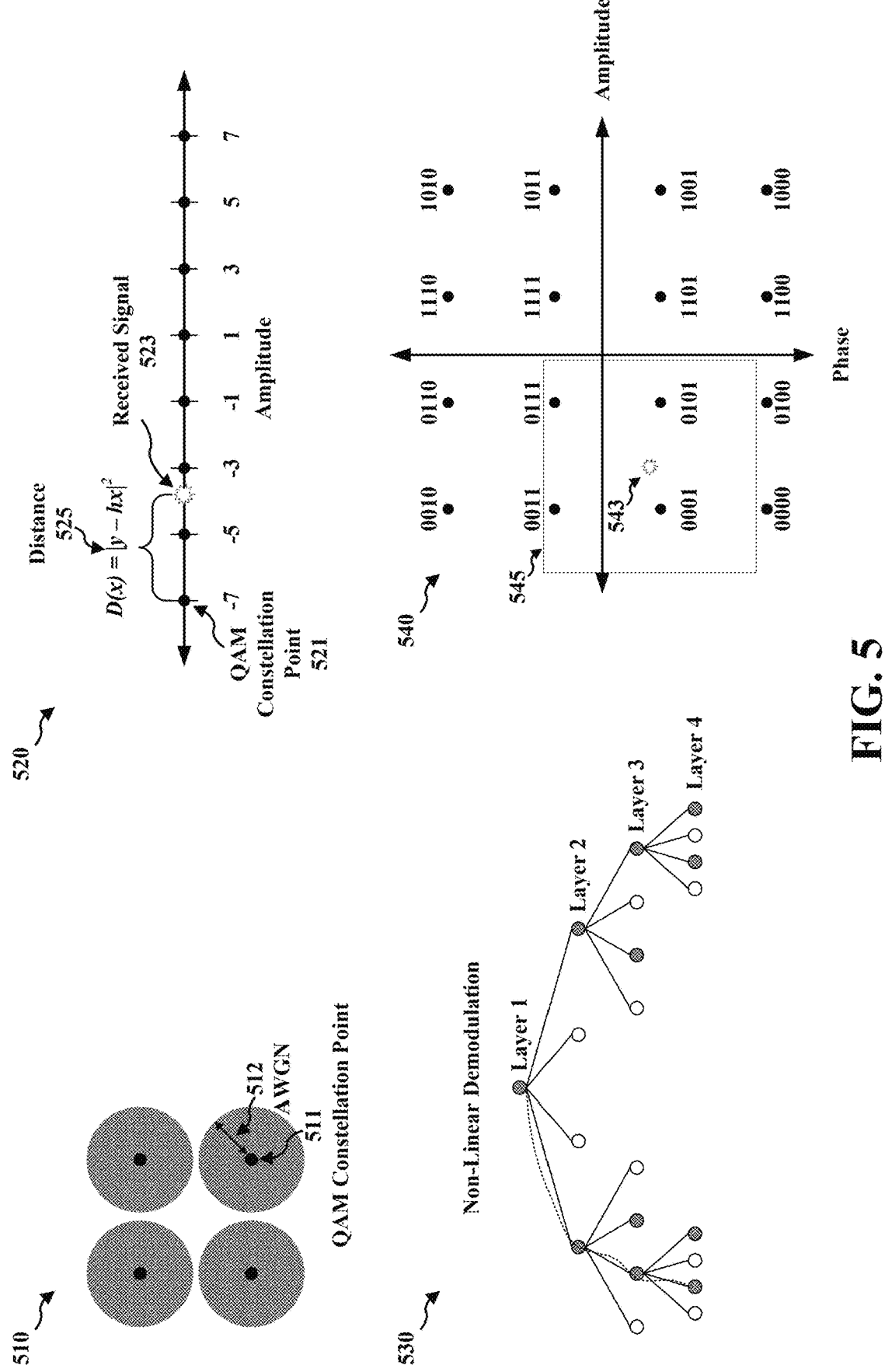
FIG. 5 is a set of diagrams illustrating aspects of a QAM signal and QAM signal demodulation and/or decoding in accordance with some aspects of the disclosure.

FIG. 5 is a set of diagrams (e.g., diagram 510, diagram 520, diagram 530, and diagram 540) illustrating aspects of a QAM signal and QAM signal demodulation and/or decoding in accordance with some aspects of the disclosure. Diagram 510 illustrates a set of QAM constellation points (e.g., QAM constellation point 511) associated with a phase and amplitude in a two-dimensional (2-D) space (e.g., with a first axis associated with an amplitude of a QAM signal and/or symbol and a second axis associated with a phase of the QAM signal and/or symbol). Diagram 510 further illustrates an area (e.g., an area associated with AWGN 512) in the 2-D space that may be associated with a particular QAM constellation point. For example, a QAM signal that is received with a phase and amplitude falling in the shaded area defined by the AWGN 512 around the QAM constellation point 511 may be interpreted (e.g., demodulated or decoded) as being the QAM constellation point 511.

Diagram 520 illustrates a distance calculation that may be associated with a demodulation of a QAM signal in some aspects. For example, a set of QAM constellation points associated with a particular phase may be associated with one of a set of amplitudes (e.g., QAM constellation point 521 associated with an amplitude of "−7"). To demodulate a received signal 523 (y), one or more distances may be calculated between the received signal 523 and one or more constellation points. For example, a distance 525 ($D(x)=|y-hx|^2$) between the received signal 523 and the QAM constellation point 521 may be determined based on the difference ($|y-hx|$) between the received signal (y) and an expected received signal (hx) based on a known channel (h) if the transmitted signal is the QAM constellation point 521 (x). In some aspects, a distance, such as the distance 525, may be calculated for each QAM constellation associated with a particular phase and the distances may be used to determine a most likely value for each of one or more bits associated with the received signal 523. In some aspects, the distance may be associated with, or proportional to, a log-likelihood (e.g., log Pr(y|x) such that −log Pr(y|x)∝D $(x)=|y-hx|^2$). For example, a demodulation may be based on one of a maximum likelihood (ML) calculation (e.g., $x^*=\text{argmax}_{x \in s}\text{Pr}(y|x)=\text{argmin}_x D(x)$, where $x^*$ is determined, or assumed, to be the transmitted signal), a LOG-MAP (maximum a posteriori) calculation (e.g., based on a log-likelihood ratio, $$LLR(b_i) = \ln\left(\frac{\sum_{x \in S_0} Pr(y \mid x)}{\sum_{x \in S_1} Pr(y \mid x)}\right) \propto \ln\left(\frac{\sum_{x \in S_0} e^{-D(x)}}{\sum_{x \in S_1} e^{-D(x)}}\right),$$

or a MAX-LOG-MAP (e.g., based on an LLR, $LLR(b_i) \propto \min_{x \in S_1} D(x) - \min_{x \in S_0} D(x)$) calculation.

Diagram 530 illustrates a non-linear demodulation associated with a multi-layer (e.g., a MIMO) QAM signal, in some aspects. The non-linear demodulation, in some aspects, may exploit the structure of one or more interference layers to improve the demodulation performance. In some aspects, for PS or PAS QAM signals, there may be a need to incorporate the non-uniform prior (e.g., information regarding the probability distribution associated with the PS or PAS QAM) for the signal and interference in the demodulator.

Diagram 540 illustrates an identification of a set of closest QAM constellation points to a received signal that may be used for a demodulation (e.g., a zero-forcing or LMMSE demodulation/decoding). For example, a signal 543 may be received at a first position in an amplitude-phase plane. To determine a value for one or more bits of the signal 543, a demodulation method may identify a set of closest QAM constellation points based on a bounding box with a first side length configured to capture a desired number of "closest" QAM constellation points. For example, the bounding box 545 may be used to determine the set of four closest QAM constellation points. Using the set of four closest QAM constellation points to determine a QAM constellation point associated with the received signal 543 may greatly reduce the set of candidate QAM constellation points (and the associated number of calculations associated with evaluating each candidate QAM constellation point) compared to considering all QAM constellation points.

Figure 6:
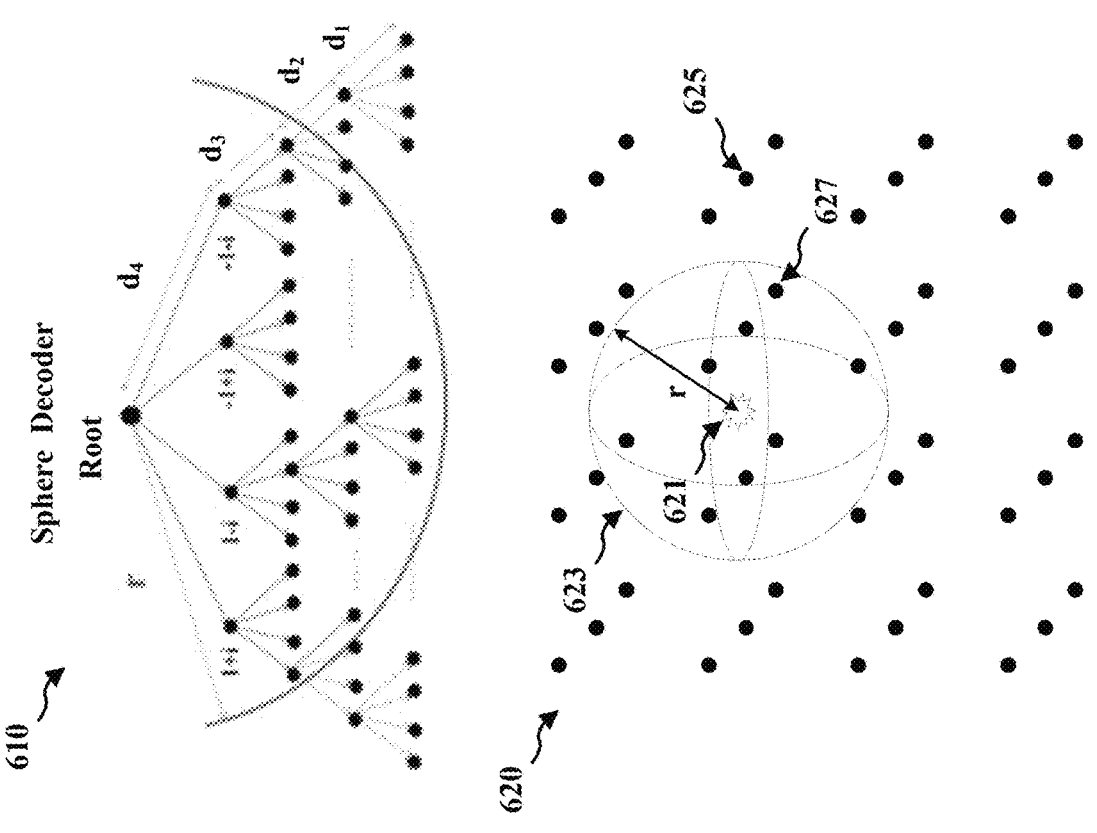
FIG. 6 is a set of diagrams illustrating an identification of a set of closest QAM constellation points for a sphere decoder in accordance with some aspects of the disclosure.

FIG. 6 is a set of diagrams (e.g., diagram 610 and diagram 620) illustrating an identification of a set of closest QAM constellation points for a sphere decoder in accordance with some aspects of the disclosure. Diagram 610 conceptually illustrates identifying a set of QAM constellation points within a sphere of radius r. In some aspects, a closest QAM constellation point may be determined from the set of QAM constellation points within the sphere of radius r. Sphere decoding, in some aspects, may provide an effective way to determine the subset of points in the lattice (a multi-dimensional lattice associated with multiple layers of 2-D lattices of QAM constellation points forming a 2N-D lattice for a set of N layers) which belong to the power sphere, by doing a layer by layer search (e.g., using a QR decomposition). In some aspects, the same technique may be applied for a PS and/or a PAS signal on the lattice scaled by the known Maxwell-Boltzmann distribution associated with the PS and/or PAS. Diagram 620 conceptually illustrates the use of the sphere 623 based on a 3-D lattice, where the 3-D lattice is used for clarity despite the spherical decoding being used for 2N-D lattice as the concept of a sphere and a radius is difficult to imagine and to represent for more than 3 dimensions. Using the spherical decoder, the set of candidate QAM constellation points (and the associated number of calculations associated with evaluating each candidate QAM constellation point) may be greatly reduced compared to considering all QAM constellation points. For example, a PAS QAM signal 621 may be received and a set of QAM constellation points (e.g., QAM constellation point 627) within the sphere 623 may be identified. The sphere decoder may then calculate a distance between the PAS QAM signal 621 and the set of QAM constellation points (e.g., QAM constellation point 627) within the sphere 623, while ignoring and/or omitting a distance calculation for QAM constellation points (e.g., QAM constellation point 625) outside the sphere.

Various aspects relate generally to a demodulation method for PAS SISO/MIMO signals. Some aspects more specifically relate to demodulating a MIMO PS signals using an input scaling to a channel and received signal prior to performing additional operations associated with a demodulation. In some examples, a wireless device (e.g., a UE) may receive, in association with the probabilistically-shaped (e.g., QAM) signal, at least one symbol associated with a detected amplitude and a detected phase and demodulate the at least one symbol based on a distance-based demodulation calculation that is adjusted based on a Maxwell-Boltzmann distribution.

Figure 7:
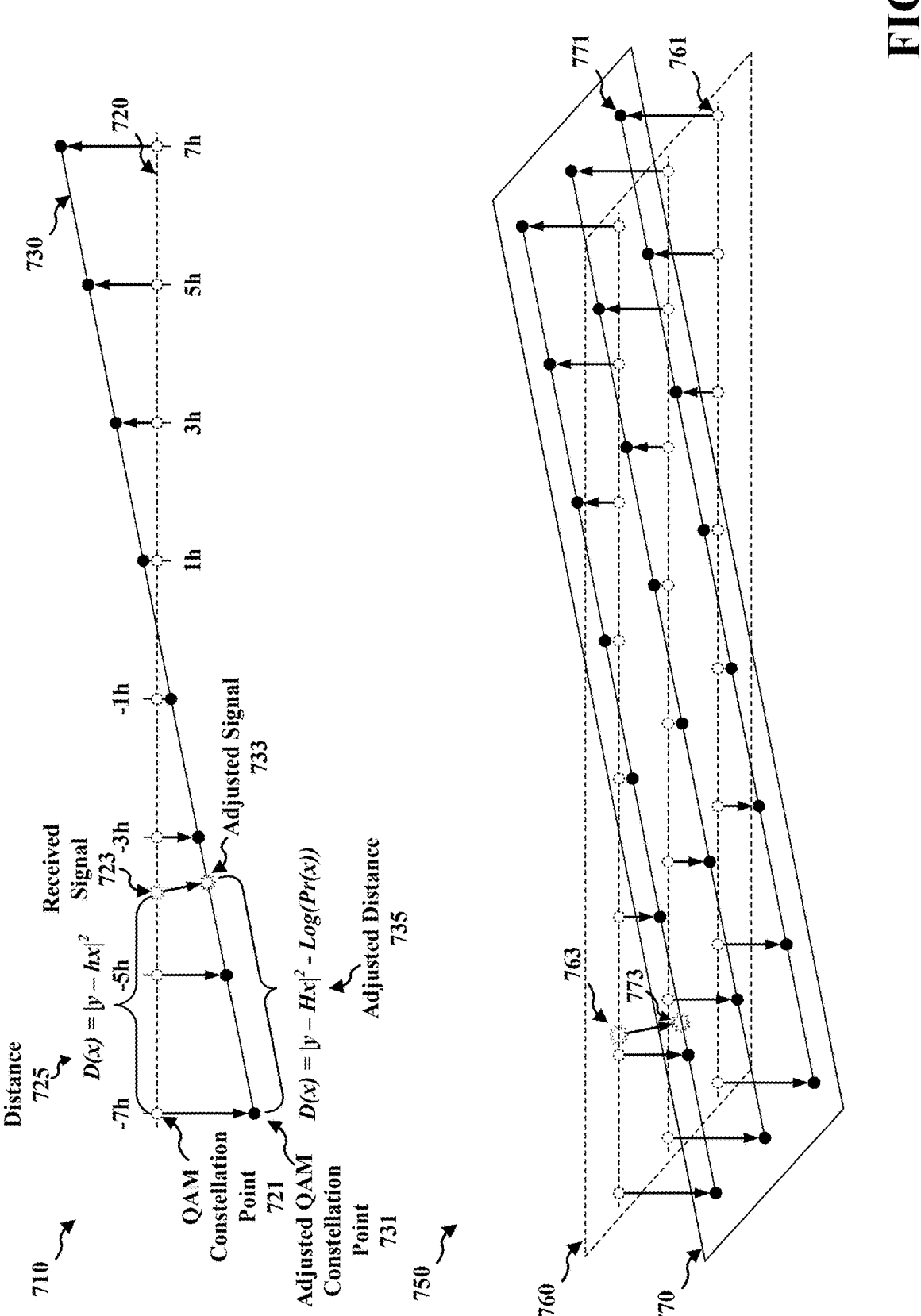
FIG. 7 is a set of diagrams illustrating an adjustment that may be made to a received QAM signal and to a QAM constellation for a demodulation in accordance with some aspects of the disclosure.

FIG. 7 is a set of diagrams (e.g., diagram 710 and diagram 750) illustrating an adjustment that may be made to a received QAM signal and to a QAM constellation for a demodulation in accordance with some aspects of the disclosure. Diagram 710 illustrates a set of QAM constellation points (e.g., including a QAM constellation point 721) along a first amplitude axis 720. A demodulation method may be associated with a projection of the first amplitude axis 720 to a second, adjusted amplitude axis 730 (e.g., a projection, or adjustment, of the QAM constellation point 721 to the adjusted QAM constellation point 731) based on a probability distribution (e.g., a Maxwell-Boltzmann distribution) of amplitudes and, in some aspects, a channel associated with a PAS QAM signal. In some aspects, the projection and/or adjustment of the QAM constellation point 721 may be interpreted as an adjustment of the amplitude associated with the QAM constellation point 721 to the amplitude associated with the adjusted QAM constellation point 731 based on the probability distribution (and channel). The different axes 720 and 730 (and the description of adjusting an axis) are used to visually depict (and conceptually describe) the amplitude adjustment. An alternate description relating to adjusting the amplitude of the QAM constellation points based on the probability distribution (and channel) may be used to refer to the same operations.

The demodulation method may further be associated with a projection of a received signal 723 to an adjusted signal 733. As described above, diagram 710 is useful for visualizing the adjustment as a projection to another axis, but may functionally be equivalent to an adjustment (e.g., a reduction) to an amplitude of the received signal 723 along the original axis (e.g., the first amplitude axis 720) by a factor, or term, based on the probability distribution (and the channel). The demodulation method may further be associated with a distance-based demodulation calculation that is adjusted based on a Maxwell-Boltzmann distribution (e.g., a distribution of amplitudes for which the probability of a QAM constellation point with amplitude x is proportional to $e^{-v|x|^2}$, or $\text{Pr}(x) \propto e^{-v|x|^2}$). For example, a distance used for the distance-based demodulation calculation may be the adjusted distance 735 ($D'(x)=|y-hx|^2-\log \text{Pr}(x)$, where for a Maxwell-Boltzmann distribution, $\log \text{Pr}(x)$ may be equal, or proportional, to $-v|x|^2$) instead of a standard distance 725 ($D(x)=|y-hx|^2$). While the adjusted distance ($D'(x)$) equation seems different from the equation for a standard distance it may be simplified to take the same form as the standard distance 725 (D(x)) when using the adjusted QAM constellation points and the adjusted received signal. For example, based on the adjustment, a QAM constellation point with amplitude hx (e.g., −7h, −5h, −3h, −1h, 1h, 3h, 5h, or 7h along the first amplitude axis 720) may be associated with a modified amplitude $(\sqrt{v+|h|^2})x$ (e.g., $-7(\sqrt{v+|h|^2})$, $-5(\sqrt{v+|h|^2})$, etc. along the adjusted amplitude axis 730) and the projection of the received signal (hy) may be associated with an amplitude $$\frac{hy}{\sqrt{v+|h|^2}}$$

based on the relative probability of the constellation points. Accordingly, the equation for distance D'(x) may be rewritten in the form $|y-hx|^2$ as $$D'(x) = \left| \frac{hy}{\sqrt{v+|h|^2}} - \sqrt{v+|h|^2}\, x \right|^2 \text{ or } (v+|h|^2) \cdot \left| \frac{h}{\sqrt{v+|h|^2}}\, y - x \right|^2.$$

Based on the correspondence of the original distance equation and the adjusted (or modified) distance equation based on the relative probabilities (e.g., based on a Maxwell-Boltzmann probability distribution) associated with the different amplitudes, a decoder configured for a standard (non-shaped) QAM signal may be reused to decode a PAS QAM signal by the inclusion of one or more multiplicative factors.

Diagram 750 is an additional illustration of the adjustment applied to a 2-D lattice. For example, a first 2-D lattice 760 of QAM constellation points (such as QAM constellation point 761) may be adjusted (e.g., projected) to an adjusted 2-D lattice 770 of adjusted QAM constellation points (such as adjusted QAM constellation point 771). Similarly, a received QAM signal 763 may be projected from the first 2-D lattice to the adjusted 2-D lattice as adjusted received QAM signal 773. As discussed above regarding the adjustment to the single axis, the adjustment of the multiple axes may be interpreted as an adjustment of the (amplitude associated with the) constellation points of a multi-layer QAM signal and the projection of the received signal may be interpreted as an adjustment of the amplitude associated with the received signal. The adjustment to the distance calculation (or formula), in some aspects, will be similar to that discussed in the single-axis example above and may be accommodated by a decoder for a multi-layer QAM signal by the inclusion of one or more multiplicative factors.

Figure 8:
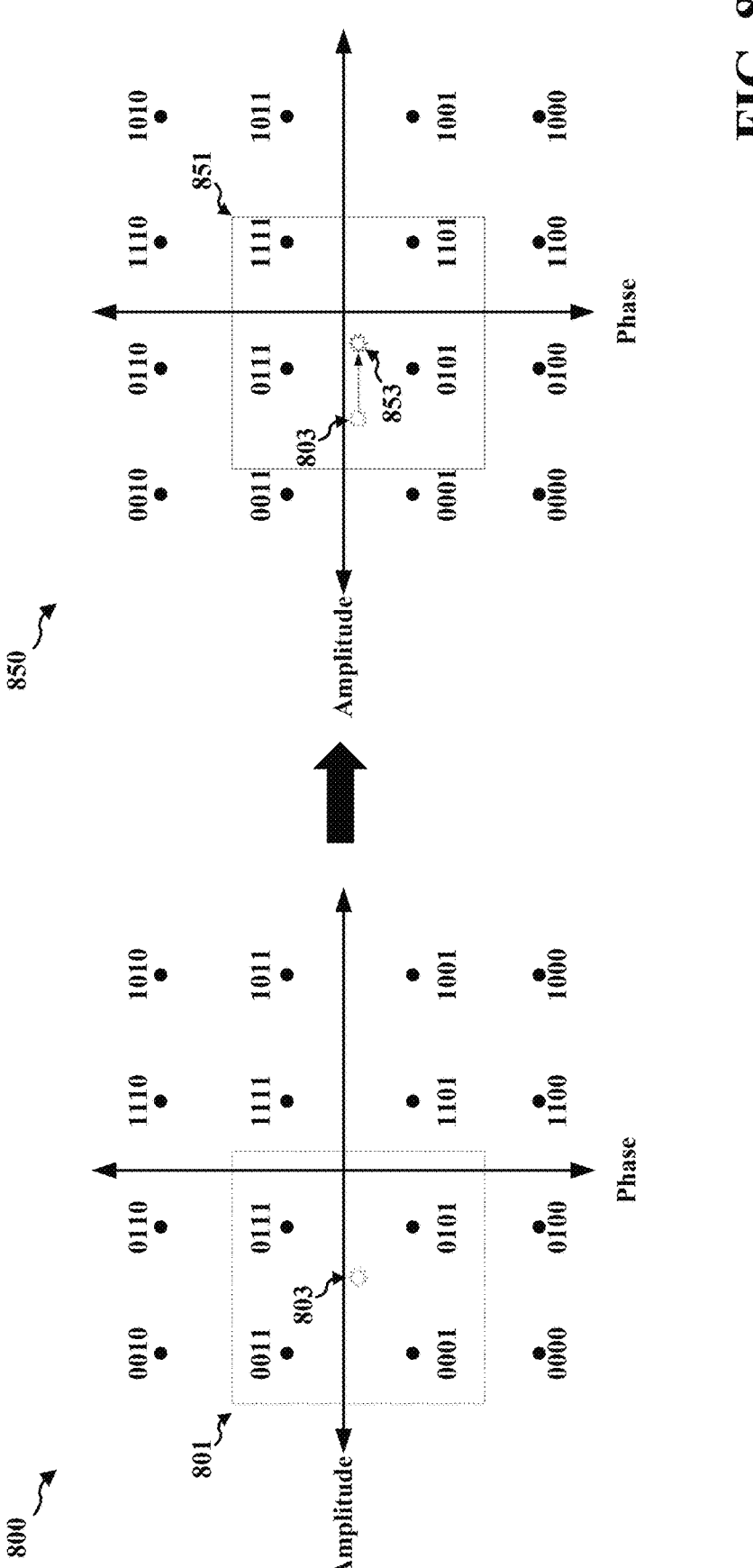
FIG. 8 is a set of diagrams illustrating an identification of a set of closest QAM constellation points based on a received signal in accordance with some aspects of the disclosure.

FIG. 8 is a set of diagrams (e.g., a diagram 800 and a diagram 850) illustrating an identification of a set of closest QAM constellation points based on a received signal 803 in accordance with some aspects of the disclosure. Diagram 800 illustrates a received signal that may be used for a demodulation (e.g., a zero-forcing or LMMSE demodulation/decoding). For example, a received signal 803 may be received at a first position in an amplitude-phase plane. To determine a value for one or more bits of the received signal 803, a demodulation method may identify a set of closest QAM constellation points based on a bounding box with a first side length configured to capture a desired number of "closest" QAM constellation points. For example, the bounding box 801 may be used to determine the set of four closest QAM constellation points. Using the set of four closest QAM constellation points to determine a QAM constellation point associated with the received signal 803 may greatly reduce the set of candidate QAM constellation points (and the associated number of calculations associated with evaluating each candidate QAM constellation point) compared to considering all QAM constellation points. Diagram 850 illustrates that, in some aspects, the demodulation method may be associated with an adjustment of the received signal 803 to an adjusted received signal 853 and a corresponding identification of a different set of four closest QAM constellation points 851 (e.g., in the adjusted set of QAM constellation points). While the QAM constellation points are illustrated as being unchanged from diagram 800 to diagram 850, it may be understood that the illustrated QAM constellation points have already been adjusted in diagram 800 as described in relation to FIG. 7.

Figure 9:
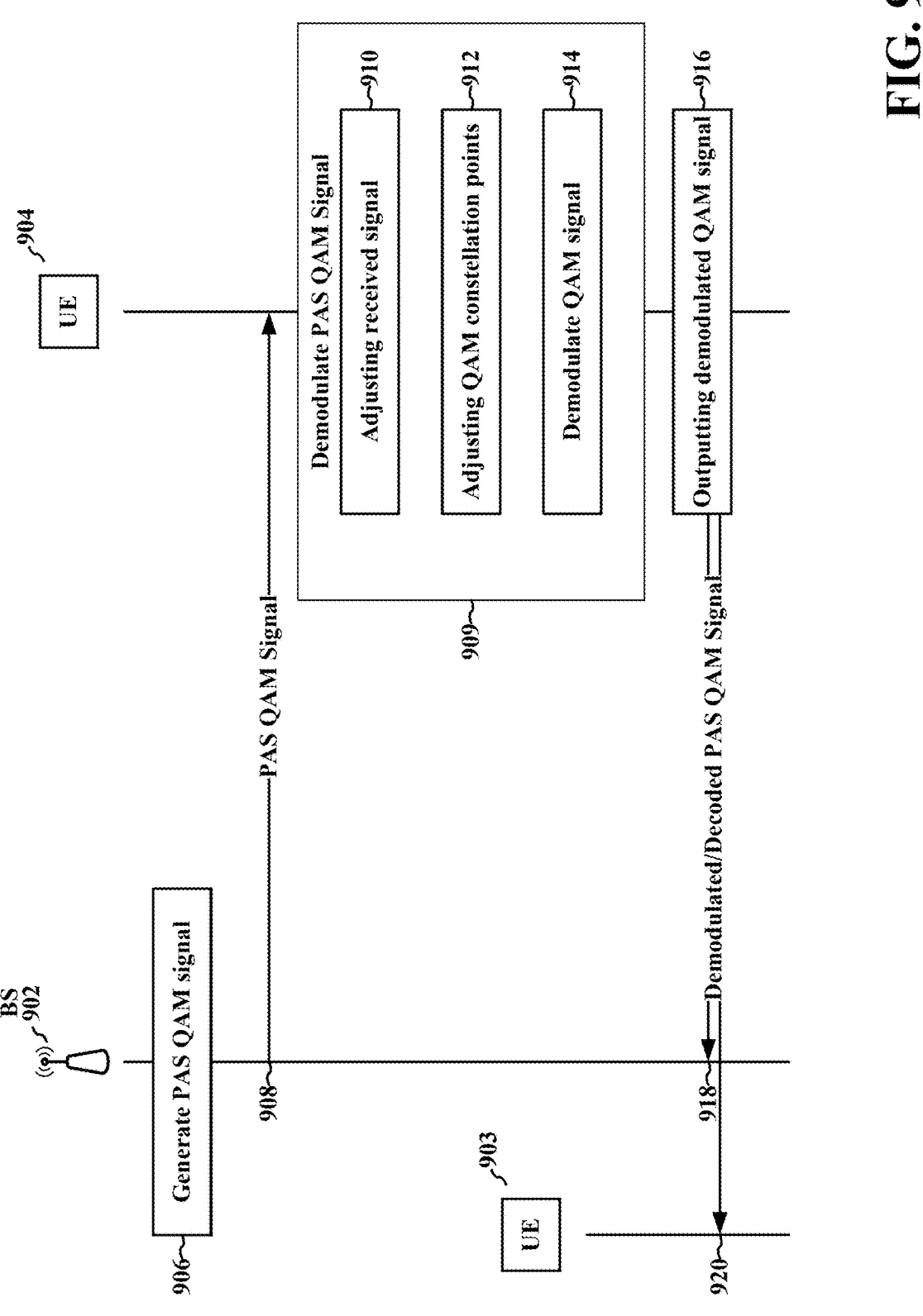
FIG. 9 is a call flow diagram illustrating a method of demodulating a PAS QAM signal in accordance with some aspects of the disclosure.

FIG. 9 is a call flow diagram 900 illustrating a method of demodulating a PAS QAM signal in accordance with some aspects of the disclosure. The base station 902 (e.g., as an example of a network device or network node that may include one or more components of a disaggregated base station) may communicate with a UE 904 (e.g., as an example of a wireless device). The functions ascribed to the base station 902, in some aspects, may be performed by one or more components of a network entity, a network node, or a network device (a single network entity/node/device or a disaggregated network entity/node/device as described above in relation to FIG. 1). Similarly, the functions ascribed to the UE 904, in some aspects, may be performed by one or more components of a wireless device supporting communication with a network entity/node/device. Accordingly, references to "transmitting" in the description below may be understood to refer to a first component of the base station 902 (or the UE 904) outputting (or providing) an indication of the content of the transmission to be transmitted by a different component of the base station 902 (or the UE 904). Similarly, references to "receiving" in the description below may be understood to refer to a first component of the base station 902 (or the UE 904) receiving a transmitted signal and outputting (or providing) the received signal (or information based on the received signal) to a different component of the base station 902 (or the UE 904). While described below in the context of a base station 902 transmitting a PAS (or PS) QAM signal to a UE 904, the specific choice of transmitting device and receiving device is not meant to be limiting. Accordingly, the base station 902 may represent any transmitting device (e.g., a base station, a UE, or any other wireless device capable of transmitting a PAS QAM signal) and the UE 904 may represent any receiving device (e.g., a base station, a UE, or any other wireless device capable of receiving a PAS QAM signal).

At 906, the base station 902 may generate (and/or determine a modulation for) a PAS QAM signal (where a PAS QAM signal is used as an example of a modulated signal that may be shaped based on a probability shaping operation associated with a known probability distribution). The generated PAS QAM signal may be based on a Maxwell-Boltzmann probability distribution or a probability distribution that may be approximated as a Maxwell-Boltzmann probability distribution. The base station 902 may transmit, and the UE 904 may receive, the PAS QAM signal 908. The PAS QAM signal 908, in some aspects, may be a single-layer signal, a multi-layer signal, and/or a MIMO signal.

At 909, the UE 904 may demodulate and/or decode the received PAS QAM signal 908. The demodulation and/or decoding at 909, in some aspects, may include the UE 904 adjusting, at 910, an amplitude of the received PAS QAM signal 908. In some aspects, the adjustment to the received PAS QAM signal 908 may include an input scaling to an estimated channel (H or h) and/or the received signal (y) based on the known probability distribution associated with the PAS QAM signal 908. For example, the received signal may be modified based on the multiplicative facto h $$\frac{h}{\sqrt{v+|h|^2}}$$

as discussed in relation to FIG. 7. Specific adjustments may be made, in some aspects, based on the type of demodulation method applied at 909.

In some aspects, the UE 904 may, at 912, and as part of demodulating and/or decoding the received PAS QAM signal 908, adjust a set of QAM constellation points used to demodulate the PAS QAM signal 908. In some aspects, the set of QAM constellation points is associated with a space defined by at least one axis related to phase and at least one axis related to amplitude, and adjusting the set of QAM constellation points includes adjusting the at least one axis related to amplitude. In some aspects, the adjusted set of QAM constellation points may be based on the probability distribution as discussed above in relation to FIG. 7. In some aspects, based on the adjusted received signal and the adjusted QAM constellation points, the UE 904 may, at 914, demodulate the received PAS QAM signal 908.

In some aspects, the demodulation may be a layer-by-layer de-mapper for probabilistic shaping (e.g., a LMMSE decoder). For example, a LLR for a PAS QAM signal may be calculated as $$LLR_{PAS}(i) = \ln\left(\frac{\sum_{x\in\mathcal{M}_{0,i}} P_X(x)p(y\mid x)}{\sum_{x\in\mathcal{M}_{1,i}} P_X(x)p(y\mid x)}\right),$$

which may be expanded as ln $$\ln\left(\sum_{x\in\mathcal{M}_{0,i}} e^{-v|x|^2}\exp\left(\frac{-|y-\tilde{h}x|^2}{N_0}\right)\right) - \ln\left(\sum_{x\in\mathcal{M}_{1,i}} e^{-v|x|^2}\exp\left(\frac{-|y-\tilde{h}x|^2}{N_0}\right)\right),$$

where $N_0$ is a noise term (e.g., a noise power per complex dimension, where a noise power per real dimension may be $$\frac{N_0}{2}),$$

h is a channel experienced by a transmitted signal x, $\eta$ is a value based on the probability distribution used for a PS or PAS (e.g., related to the value v of the function $e^{-v|x|^2}$ used to determine a probability for, or associated with, each amplitude of an associated signal x) and $\tilde{h}=h\sqrt{\eta}$. The expanded equation may be expressed as ln $$\ln\left(\sum_{x\in\mathcal{M}_{0,i}} \exp\left(\frac{-|\tilde{h}*\alpha y - x|^2}{\alpha\cdot N_0}\right)\right) -$$

-continued $$\ln\left(\sum_{x\in\mathcal{M}_{1,i}} \exp\left(\frac{-|\tilde{h}*\alpha y - x|^2}{\alpha\cdot N_0}\right)\right), \text{ where } \alpha = \frac{1}{vN_0+|\tilde{h}|^2}.$$

For example, in relation to diagram 710, the adjusted signal 733 may be associated with the term $\tilde{h}*\alpha y$ and the adjusted QAM constellation points (e.g., adjusted QAM constellation point 731 associated with an adjusted amplitude) may be associated with the term x, where both terms may be scaled by $1/(\alpha\cdot N_0)$. Accordingly, as illustrated for the equations D(x) and D'(x), the equations based on the adjusted amplitude values can be simplified to be of the same form as a standard LLR calculation with the addition of a multiplicative factor. Based on the equivalence of the form of the equations, the same demodulation and/or slicer may be used for demodulation and/or slicing of a PAS QAM signal as may be used for a uniform QAM signal based on scaling the received signal (y), the noise power (NO), and the channel estimate (h) (e.g., at 910), and based on the scaling of the QAM constellation (e.g., at 912). Similar equivalence between equations for different demodulation schemes and/or methods discussed below can be shown in the same manner as illustrated for the LMMSE decoder and the distance based calculation described in relation to FIG. 7.

The demodulation at 909 (e.g., at 914), in some aspects, may include a zero-force and/or LMMSE demodulation based on a set of closest QAM constellation points (e.g., as described in relation to diagram 540 of FIG. 5 and FIG. 8). For example, a uniform QAM may use a first metric $$x_{ML} = \underset{x}{\operatorname{argmin}}|y_{ZF} - x|^2$$

and a PS and/or PAS QAM may use an adjusted metric $$x_{ML} = \underset{x}{\operatorname{argmin}}|y - hx|^2 + v|x|^2$$

which may be simplified to $$x_{ML} = \underset{x}{\operatorname{argmin}}|\eta y - x|^2$$

based on a scaling of the received signal, the channel estimation (e.g., at 910), and the QAM constellation points (e.g., 912).

In some aspects, the demodulation at 909 (e.g., at 914) may be a decision feedback demodulation applied to a MIMO transmission and may be associated with a QR decomposition of the channel (H or h) (to produce an upper diagonal matrix). For example, a multi-layer signal may be represented as $$\begin{pmatrix} y_0 \\ y_1 \\ y_2 \end{pmatrix} = \begin{pmatrix} r_{00} & r_{01} & r_{02} \\ 0 & r_{11} & r_{12} \\ 0 & 0 & r_{22} \end{pmatrix}\begin{pmatrix} x_0 \\ x_1 \\ x_2 \end{pmatrix} + \begin{pmatrix} n_0 \\ n_1 \\ n_2 \end{pmatrix},$$

or $\vec{y}=R\vec{x}+\vec{n}$ where $y_i$ is a received signal associated with an $i^{th}$ layer, $x_i$ is a transmitted signal associated with an $i^{th}$ layer, and $n_i$ is a noise associated with an $i^{th}$ layer. The demodulation may include computing a hypothesis for $\vec{x} = [x_1, \ldots, x_m]$ for m layers of a MIMO signal. A distance computation associated with the demodulation method may be $D(x) = \|y - Rx\|^2 - \log \Pr(x)$ or $$\sum_{i=1}^{m} \left| y_i - \sum_{j=1}^{m} r_{ij} x_i \right|^2 - \log Pr(x_i)$$

where the term $\log \Pr(x_i)$ accounts for the PS and/or PAS. The distance computation may be rewritten as $$D_{2,k} = |y_2 - r_{22} x_{2,k}|^2 + v|x_{2,k}|^2 \text{ or } |\tilde{y}_2 - \tilde{r}_{22} x_2|^2 + \frac{v}{|\tilde{r}_{22}|^2}|\tilde{y}_2|^2,$$

where $$\tilde{y}_2 \triangleq \frac{r_{22}}{\sqrt{|r_{22}|^2 + v}} y_2, \text{ and } \tilde{r}_{22} \triangleq \sqrt{|r_{22}|^2 + v}$$

based on an adjustment to the received signal (e.g., at 910) and the QAM constellation points (e.g., at 912). After this reformulation, the distance computation, in some aspects, may factorize into two terms, with a first term, $|\tilde{y}_2 - \tilde{r}_{22} x_2|^2$, depending on the hypothesis of the transmitted signal x (e.g., including a term related to x) and a second term, $$\frac{v}{|\tilde{r}_{22}|^2}|\tilde{y}_2|^2,$$

that does not depend on the hypothesis of the transmitted signal x. Furthermore, the first term is in the form of $|y - ax|^2$, which is effectively the same expression that needs to be computed for a signal associated with uniform QAM (where a is one of h or $\tilde{r}_{22}$). Accordingly, after applying the scaling and/or adjustment, the computation logic in a regular QAM demodulator may be used (or reused) to demodulate the PAS QAM signal. For subsequent layers a similar scaling may be applied to the received signal and channel during the decision feedback demodulation (e.g., at 909 or 914).

The demodulation at 909 (e.g., at 914), in some aspects, may include a lattice decoding for PS and/or PAS QAM for a MIMO transmission. In some aspects, assuming N MIMO layers, input scaling (e.g., at 912) for the Maxwell-Boltzmann prior (e.g., a probability distribution such that log $\Pr(x) \propto -|x|^2$), translates the 2N-(real) dimensional lattice of MIMO constellation points (after the effect of applying a channel matrix), such as the first 2-D lattice 760, to another 2N-dimensional lattice, such as the adjusted 2-D lattice 770, in a 4N-dimensional ambient space (e.g., as described in relation to diagram 750 of FIG. 7). In performing the translation, or adjustment, in some aspects, each dimension (of the lattice) first becomes two dimensions (a first dimension related to the geometric structure of the lattice such as the first amplitude axis 720 in diagram 710 and a second dimension related to the probability structure such as the vertical axis in diagram 710) and then, after projection, the two dimensions may be reverted to one dimension (e.g., along the adjusted amplitude axis 730 of diagram 710). In some aspects, using the Maxwell-Boltzmann distribution to adjust the QAM constellation points may preserve the lattice structure (e.g., as illustrated in diagram 750). Accordingly, in some aspects, lattice decoding methods that are used in MIMO decoding may be used after a projection (e.g., an adjustment at 910) of the received point to the subspace containing the translated, or adjusted, lattice of MIMO QAM constellation points, and then using lattice decoding to find the nearest MIMO QAM constellation points. While discussed in terms of adjusted spaces and/or axes, the adjustment may be understood as an adjustment to the amplitude associated with each of the QAM constellation points (or subsets of QAM constellation points associated with a corresponding layer of a multi-layer MIMO QAM signal) in the set of QAM constellation points associated with the MIMO QAM signal.

For example, a sphere decoder may be used to perform the demodulation at 909 (e.g., at 914) based on the adjustment (e.g., at 910) to the received signal and the MIMO QAM constellation points (e.g., at 912) based on the known Maxwell-Boltzmann probability distribution associated with the PAS (or PS) MIMO QAM signal. As described in relation to FIG. 6, a sphere decoder may identify all QAM constellation points within a sphere of radius r from a received QAM signal, and then identify a QAM constellation closest point to the received QAM signal from the identified QAM constellation points within the sphere of radius r. As described above in FIG. 6 and in the example of the decision feedback demodulation, a QR decomposition may be used to determine the subset of points within the sphere by doing a layer-by-layer search based on the adjusted (e.g., at 910) received signal and the adjusted (e.g., at 912) multi-layer QAM constellation points. The sphere decoding may use the adjusted signal (e.g., $\tilde{y}_2$), channel (e.g., $\tilde{r}_{22}$), and distance calculation $$\left(\text{e.g., } D_{2,k} = |\tilde{y}_2 - \tilde{r}_{22} x_2|^2 + \frac{v}{|\tilde{r}_{22}|^2}|\tilde{y}_2|^2\right)$$

as described above in relation to the decision feedback demodulation.

In some aspects, the known probability distribution associated with a PAS (or PS) QAM signal may not be an exact Maxwell-Boltzmann probability distribution. However, in some aspects, if the known probability distribution can be approximated by a Maxwell-Boltzmann probability distribution, the method above may be applied using an adjustment based on the Maxwell-Boltzmann probability distribution approximating the known probability distribution to simplify a demodulation of the PAS (or PS) QAM signal. For example, in the demodulator, a first step may include determining and/or finding a closest MB distribution to the actual probability distribution. The determined MB distribution may be used to demodulate a received signal. The closeness, in some aspects, may be measured by metrics and/or distances defined in the space of probability distributions, e.g., a Kullback-Leibler divergence, a chi-square ($\chi^2$) distance, or other distance measure.

After demodulation, the UE 904 may output, at 916, the demodulated PAS QAM signal (e.g., the information, or decoded set of bits, transmitted via the PAS QAM signal 908) for at least one of local storage or to an additional device. For example, the UE 904 may transmit the demodulated/decoded PAS QAM signal 918, or the demodulated/decoded PAS QAM signal 920, (e.g., the information, or decoded set of bits, transmitted via the PAS QAM signal

908) to the base station 902, or to the UE 903 (as an example of an additional device), respectively.

Figure 10:
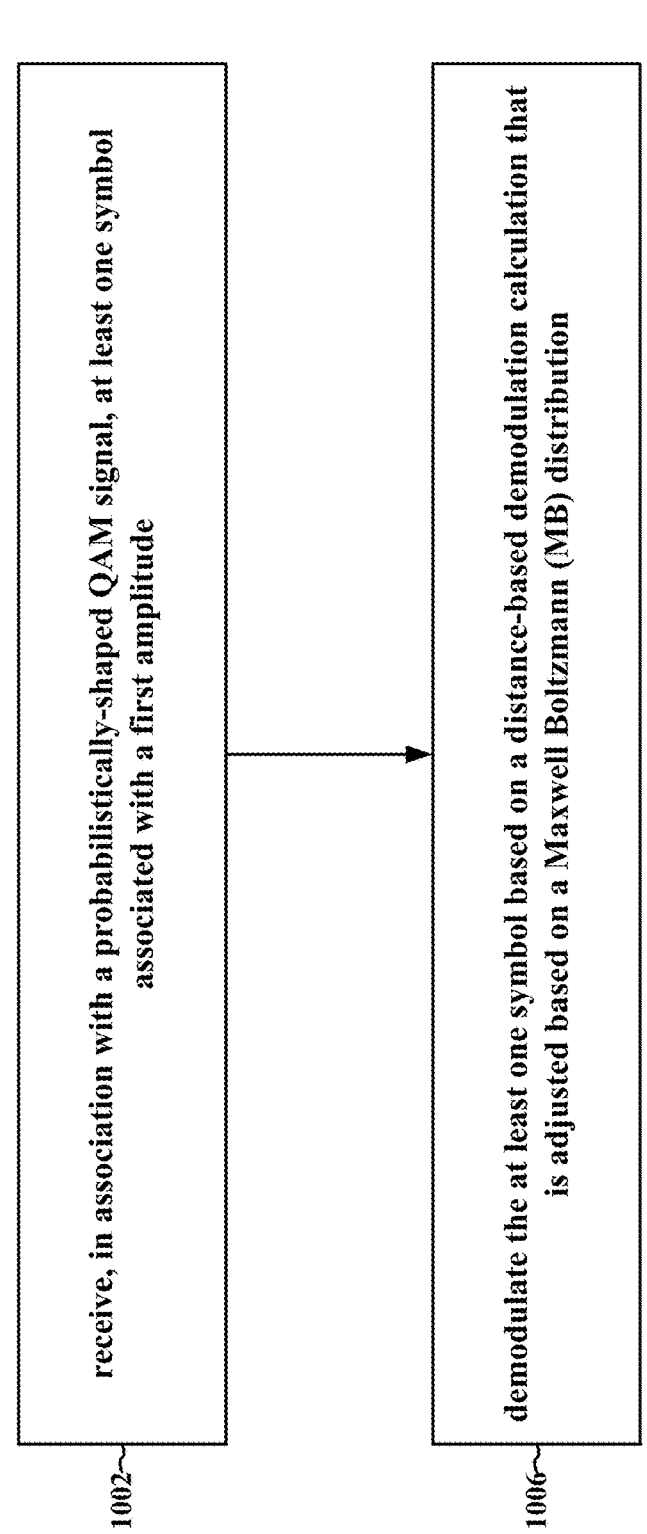
FIG. 10 is a flowchart of a method of wireless communication.

FIG. 10 is a flowchart 1000 of a method of wireless communication. The method may be performed by a decoding, or wireless, device such as a UE (e.g., the UE 104, 904; the apparatus 1204) or a base station (e.g., the base station 102, 902; the network entity 1202, 1302). A transmitting device may transmit a probabilistically-shaped QAM signal associated with a phase modulation and an amplitude modulation. At 1002, a decoding device may receive, in association with the probabilistically-shaped QAM signal, at least one symbol associated with a detected amplitude and a detected phase. For example, 1002 may be performed by application processor(s) 1206, cellular baseband processor(s) 1224, transceiver(s) 1222, antenna(s) 1280, and/or PAS QAM demodulation component 198 of FIG. 12, or by CU processor(s) 1312, DU processor(s) 1332, RU processor(s) 1342, transceiver(s) 1346, antenna(s) 1380, and/or PAS QAM demodulation component 198 of FIG. 13. In some aspects, the probabilistically-shaped QAM signal may be one of a QAM signal shaped based on a Maxwell-Boltzmann probability distribution or a QAM signal shaped based on a non-Maxwell-Boltzmann probability distribution. The non-Maxwell-Boltzmann probability distribution, in some aspects, may be approximated by a Maxwell-Boltzmann probability distribution. The probabilistically-shaped signal, in some aspects, may be a single-layer signal. In some aspects, the probabilistically-shaped signal may be a multiple-layer, and/or MIMO, signal. For example, referring to FIG. 9, the UE 904 may receive PAS QAM signal 908.

In some aspects, the decoding device may adjust the amplitude of the set of QAM constellation points and adjust the first amplitude of the probabilistically-shaped QAM signal associated with the phase modulation and the amplitude modulation. A multiple-layer signal, in some aspects, may include a first number of layers (e.g., N layers) and the set of QAM constellation points may include a second number (equal to the first number) of subsets of QAM constellation points (e.g., N subsets) corresponding to the first number of layers. The adjustment of the amplitude of the set of QAM constellation points and the first amplitude of the probabilistically-shaped QAM signal, in some aspects, may be based on a channel and a Maxwell-Boltzmann distribution associated with the probabilistically-shaped QAM signal. In some aspects, each of the first number of subsets of QAM constellation points may be in a corresponding one of a third number (e.g., equal to the first and second numbers) of spaces (e.g., N spaces) including an axis related to phase and an axis related to the amplitude. For example, the third number of spaces may be considered to be a single 2N-dimensional space including the N subsets of QAM constellation points associated with the N-layer signal. Adjusting the amplitude of the set of QAM constellation points, in some aspects, may be associated with adjusting an axis related to amplitude for each of the first number of layers. For example, referring to FIG. 9, the UE 904 may adjust, at 910, the received PAS QAM signal 908 and adjust, at 912, the set of QAM constellation points used to demodulate the PAS QAM signal 908.

At 1006, the decoding device may demodulate the at least one symbol based on a distance-based demodulation calculation that is adjusted based on a known probability distribution of symbol amplitudes, e.g., a Maxwell-Boltzmann distribution. In some aspects, as part of the demodulation at 1006, the decoding device may calculate a distance between a received symbol and at least one potential demodulated symbol using the adjusted amplitude of the set of QAM constellation points and the adjusted first amplitude (e.g., in a space defined by at least one axis related to phase and at least one axis related to amplitude). For example, 1006 may be performed by application processor(s) 1206, cellular baseband processor(s) 1224, transceiver(s) 1222, antenna(s) 1280, and/or PAS QAM demodulation component 198 of FIG. 12, or by CU processor(s) 1312, DU processor(s) 1332, RU processor(s) 1342, transceiver(s) 1346, antenna(s) 1380, and/or PAS QAM demodulation component 198 of FIG. 13. In some aspects, the distance-based demodulation calculation may use the adjusted at least one axis related to the amplitude and the adjusted detected amplitude (e.g., the at least one axis and detected amplitude adjusted at 1004) to calculate the distance between the at least one symbol and the at least one potential demodulated symbol. For a multi-layer received signal, in some aspects, the distance-based demodulation calculation uses the adjusted amplitude of the set of QAM constellation points and the adjusted first amplitude (e.g., the adjusted axis related to the amplitude for each of the first number of layers) to calculate the distance between the at least one symbol and the at least one potential demodulated symbol. In some aspects, the distance-based demodulation calculation is associated with one of a LMMSE, a layer-by-layer demodulation calculation (e.g., a decision feedback demodulation calculation), a lattice decoding calculation, or a spherical decoding calculation.

In some aspects, the decoding device may output the demodulated at least one symbol for at least one of local storage or transmission to an additional device. Referring to FIG. 9, for example, the UE 904 may output, at 916, the demodulated PAS QAM signal (e.g., the information, or decoded set of bits, transmitted via the PAS QAM signal 908) for at least one of local storage or to an additional device. For example, the UE 904 may transmit the demodulated/decoded PAS QAM signal 918, or the demodulated/decoded PAS QAM signal 920, (e.g., the information, or decoded set of bits, transmitted via the PAS QAM signal 908) to the base station 902, or to the UE 903 (as an example of an additional device), respectively.

FIG. 11 is a flowchart 1100 of a method of wireless communication. The method may be performed by a decoding, or wireless, device such as a UE (e.g., the UE 104, 904; the apparatus 1204) or a base station (e.g., the base station 102, 902; the network entity 1202, 1302). A transmitting device may transmit a probabilistically-shaped QAM signal associated with a phase modulation and an amplitude modulation. At 1102, a decoding device may receive, in association with the probabilistically-shaped QAM signal, at least one symbol associated with a detected amplitude and a detected phase. For example, 1102 may be performed by application processor(s) 1206, cellular baseband processor(s) 1224, transceiver(s) 1222, antenna(s) 1280, and/or PAS QAM demodulation component 198 of FIG. 12, or by CU processor(s) 1312, DU processor(s) 1332, RU processor(s) 1342, transceiver(s) 1346, antenna(s) 1380, and/or PAS QAM demodulation component 198 of FIG. 13. In some aspects, the probabilistically-shaped QAM signal may be one of a QAM signal shaped based on a Maxwell-Boltzmann probability distribution or a QAM signal shaped based on a non-Maxwell-Boltzmann probability distribution. The non-Maxwell-Boltzmann probability distribution, in some aspects, may be approximated by a Maxwell-Boltzmann probability distribution. The probabilistically-shaped signal, in some aspects, may be a single-layer signal. In some aspects, the probabilistically-shaped signal may be a multiple-layer, and/or MIMO, signal. For example, referring to FIG. 9, the UE 904 may receive PAS QAM signal 908.

At 1104, the decoding device may the amplitude of the set of QAM constellation points and adjust the first amplitude of the probabilistically-shaped QAM signal associated with the phase modulation and the amplitude modulation. For example, 1104 may be performed by application processor(s) 1206, cellular baseband processor(s) 1224, transceiver(s) 1222, antenna(s) 1280, and/or PAS QAM demodulation component 198 of FIG. 12, or by CU processor(s) 1312, DU processor(s) 1332, RU processor(s) 1342, transceiver(s) 1346, antenna(s) 1380, and/or PAS QAM demodulation component 198 of FIG. 13. A multiple-layer signal, in some aspects, may include a first number of layers (e.g., N layers) and the set of QAM constellation points may include a second number (equal to the first number) of subsets of QAM constellation points (e.g., N subsets) corresponding to the first number of layers. The adjustment of the amplitude of the set of QAM constellation points and the first amplitude of the probabilistically-shaped QAM signal, in some aspects, may be based on a channel and a Maxwell-Boltzmann distribution associated with the probabilistically-shaped QAM signal. In some aspects, each of the first number of subsets of QAM constellation points may be in a corresponding one of a third number (e.g., equal to the first and second numbers) of spaces (e.g., N spaces) including an axis related to phase and an axis related to the amplitude. For example, the third number of spaces may be considered to be a single 2N-dimensional space including the N subsets of QAM constellation points associated with the N-layer signal. Adjusting the amplitude of the set of QAM constellation points, in some aspects, may be associated with adjusting an axis related to amplitude for each of the first number of layers. For example, referring to FIG. 9, the UE 904 may adjust, at 910, the received PAS QAM signal 908 and adjust, at 912, the set of QAM constellation points used to demodulate the PAS QAM signal 908.

At 1106, the decoding device may demodulate the at least one symbol based on a distance-based demodulation calculation that is adjusted based on a known probability distribution of symbol amplitudes, e.g., a Maxwell-Boltzmann distribution. In some aspects, as part of the demodulation at 1106, the decoding device may, at 1107, calculate a distance between a received symbol and at least one potential demodulated symbol using the adjusted amplitude of the set of QAM constellation points and the adjusted first amplitude (e.g., in a space defined by at least one axis related to phase and at least one axis related to amplitude). For example, 1106 and 1107 may be performed by application processor(s) 1206, cellular baseband processor(s) 1224, transceiver(s) 1222, antenna(s) 1280, and/or PAS QAM demodulation component 198 of FIG. 12, or by CU processor(s) 1312, DU processor(s) 1332, RU processor(s) 1342, transceiver(s) 1346, antenna(s) 1380, and/or PAS QAM demodulation component 198 of FIG. 13. In some aspects, the distance-based demodulation calculation may use the adjusted at least one axis related to the amplitude and the adjusted detected amplitude (e.g., the at least one axis and detected amplitude adjusted at 1104) to calculate the distance between the at least one symbol and the at least one potential demodulated symbol. For a multi-layer received signal, in some aspects, the distance-based demodulation calculation uses the adjusted amplitude of the set of QAM constellation points and the adjusted first amplitude (e.g., the adjusted axis related to the amplitude for each of the first number of layers) to calculate the distance between the at least one symbol and the at least one potential demodulated symbol. In some aspects, the distance-based demodulation calculation is associated with one of a LMMSE, a layer-by-layer demodulation calculation (e.g., a decision feedback demodulation calculation), a lattice decoding calculation, or a spherical decoding calculation.

At 1108, the decoding device may output the demodulated at least one symbol for at least one of local storage or transmission to an additional device. For example, 1108 may be performed by application processor(s) 1206, cellular baseband processor(s) 1224, transceiver(s) 1222, antenna(s) 1280, and/or PAS QAM demodulation component 198 of FIG. 12, or by CU processor(s) 1312, DU processor(s) 1332, RU processor(s) 1342, transceiver(s) 1346, antenna(s) 1380, and/or PAS QAM demodulation component 198 of FIG. 13. Referring to FIG. 9, for example, the UE 904 may output, at 916, the demodulated PAS QAM signal (e.g., the information, or decoded set of bits, transmitted via the PAS QAM signal 908) for at least one of local storage or to an additional device. For example, the UE 904 may transmit the demodulated/decoded PAS QAM signal 918, or the demodulated/decoded PAS QAM signal 920, (e.g., the information, or decoded set of bits, transmitted via the PAS QAM signal 908) to the base station 902, or to the UE 903 (as an example of an additional device), respectively.

Figure 12:
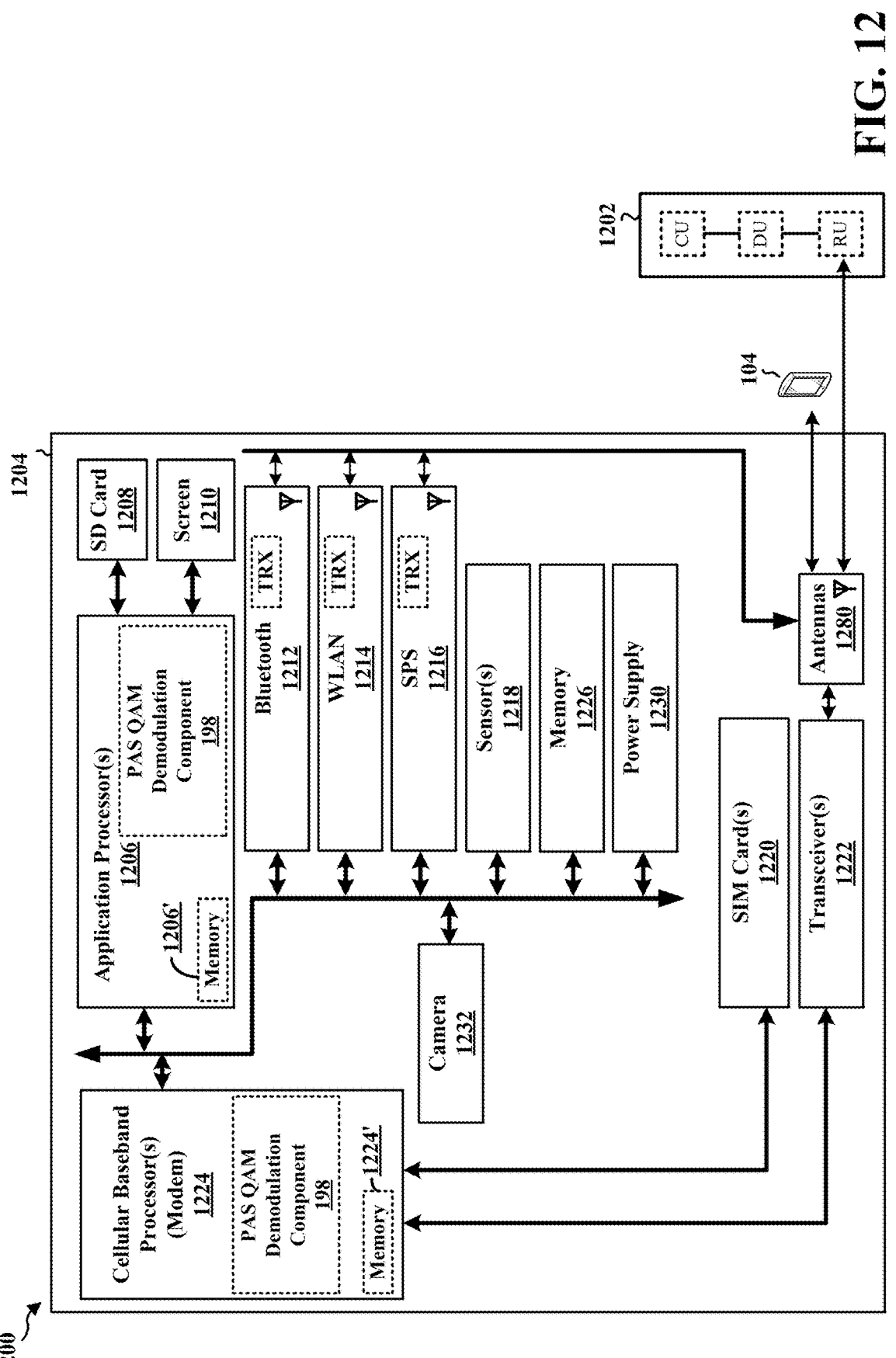
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize one or more antennas 1280 for communication. The cellular baseband processor(s) 1224 communicates through the transceiver(s) 1222 via the one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the PAS QAM demodulation component 198 may be configured to receive, in association with a probabilistically-shaped QAM signal, at least one symbol associated with a first amplitude and demodulate the at least one symbol based on a distance-based demodulation calculation that is adjusted based on a Maxwell-Boltzmann distribution. The PAS QAM demodulation component 198 may be within the cellular baseband processor(s) 1224, the application processor(s) 1206, or both the cellular baseband processor(s) 1224 and the application processor(s) 1206. The PAS QAM demodulation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for receiving, in association with a probabilistically-shaped QAM signal, at least one symbol associated with a first amplitude. The apparatus 1204, and in particular the cellular baseband processor(s) 1224 and/or the application processor(s) 1206, may include means for demodulating the at least one symbol based on a distance-based demodulation calculation that is adjusted based on a Maxwell-Boltzmann distribution. The apparatus 1204, and in particular the cellular baseband processor(s) 1224 and/or the application processor(s) 1206, may include means for outputting the demodulated at least one symbol for at least one of local storage or transmission to an additional device. The apparatus 1204, and in particular the cellular baseband processor(s) 1224 and/or the application processor(s) 1206, may include means for calculating a distance between a received symbol and at least one potential demodulated symbol. The apparatus 1204, and in particular the cellular baseband processor(s) 1224 and/or the application processor(s) 1206, may include means for adjusting the amplitude of the set of QAM constellation points. The apparatus 1204, and in particular the cellular baseband processor(s) 1224 and/or the application processor(s) 1206, may include means for adjusting the first amplitude. The apparatus 1204, and in particular the cellular baseband processor(s) 1224 and/or the application processor(s) 1206, may include means for calculating the distance between the at least one symbol and the at least one potential demodulated symbol using the adjusted amplitude of the set of QAM constellation points and the adjusted first amplitude. The apparatus 1204, and in particular the cellular baseband processor(s) 1224 and/or the application processor(s) 1206, may include means for adjusting the amplitude of the set of QAM constellation points for each of a first number of layers. The apparatus 1204 may further include means for performing any of the aspects described in connection with the flowcharts in FIG. 10 or 11, and/or performed by the UE in the communication flow of FIG. 9. The means may be the PAS QAM demodulation component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 10 and 11.

Figure 13:
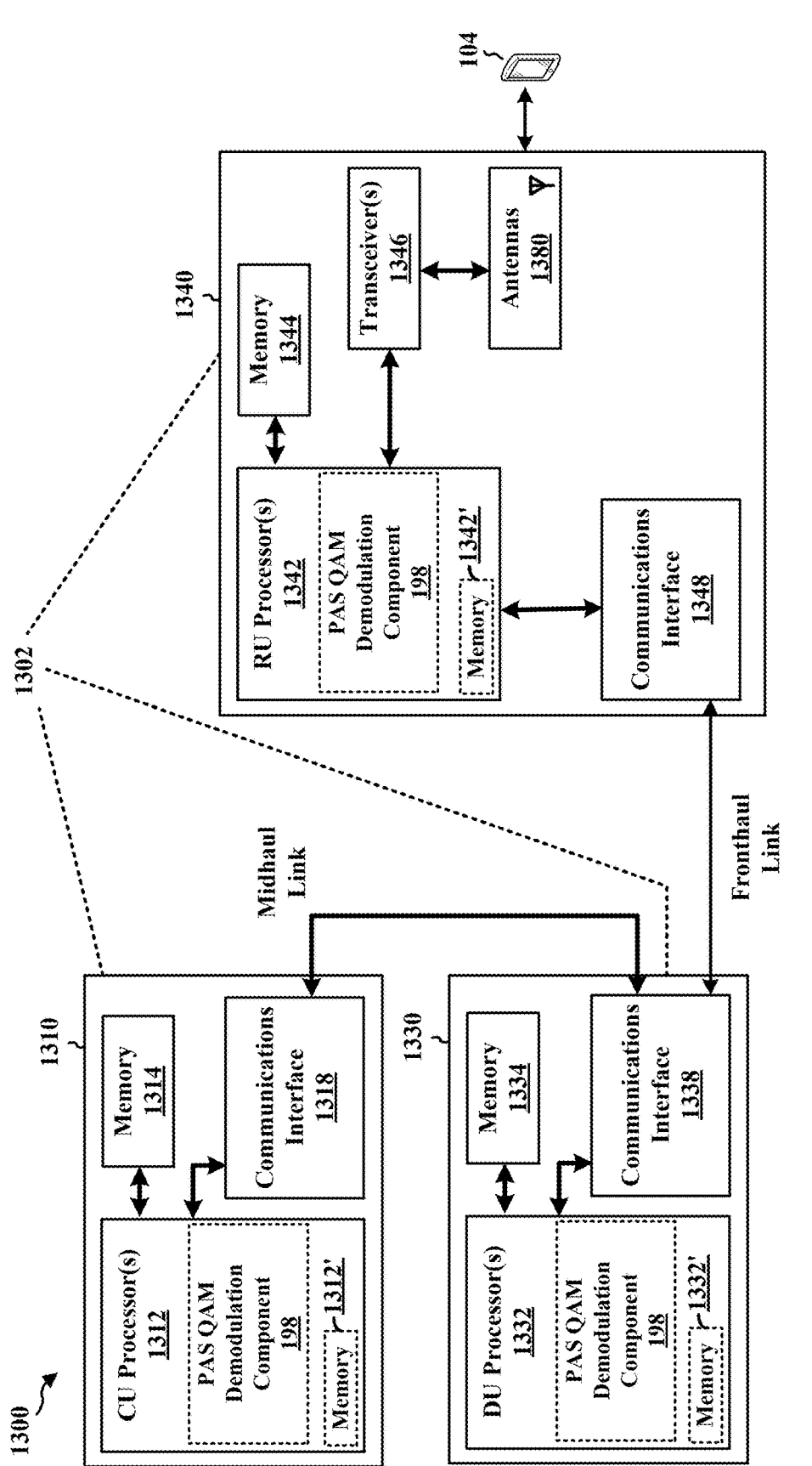
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the PAS QAM demodulation component 198, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, one or more antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the PAS QAM demodulation component 198 may be configured to receive, in association with a probabilistically-shaped QAM signal, at least one symbol associated with a first amplitude and demodulate the at least one symbol based on a distance-based demodulation calculation that is adjusted based on a Maxwell-Boltzmann distribution. The PAS QAM demodulation component 198 may be within one or more processors of one or more of the CU 1310, DU 1330, and the RU 1340. The PAS QAM demodulation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 may include means for receiving, in association with a probabilistically-shaped QAM signal, at least one symbol associated with a first amplitude. The network entity 1302 may include means for demodulating the at least one symbol based on a distance-based demodulation calculation that is adjusted based on a Maxwell-Boltzmann distribution. The network entity 1302 may include means for outputting the demodulated at least one symbol for at least one of local storage or transmission to an additional device. The network entity 1302 may include means for calculating a distance between a received symbol and at least one potential demodulated symbol. The network entity 1302 may include means for adjusting the amplitude of the set of QAM constellation points. The network entity 1302 may include means for adjusting the first amplitude. The network entity 1302 may include means for calculating the distance between the at least one symbol and the at least one potential demodulated symbol using the adjusted amplitude of the set of QAM constellation points and the adjusted first amplitude. The network entity 1302 may include means for adjusting the amplitude of the set of QAM constellation points for each of a first number of layers. The apparatus 1204 may further include means for performing any of the aspects described in connection with the flowcharts in FIG. 10 or 11, and/or performed by the UE in the communication flow of FIG. 9. The means may be the PAS QAM demodulation component 198 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 10 and 11.

Various aspects relate generally to a demodulation method for probabilistic-amplitude-shaped (PAS) SISO/MIMO signals. Some aspects more specifically relate to demodulating a MIMO PS signals using an input scaling to a channel and to a received signal prior to performing additional operations associated with a demodulation. In some examples, a wireless device (e.g., a UE) may receive, in association with the probabilistically-shaped (e.g., QAM) signal, at least one symbol associated with a detected amplitude and a detected phase and demodulate the at least one symbol based on a distance-based demodulation calculation that is adjusted based on a Maxwell-Boltzmann distribution. For example, in some aspects, when a QAM constellation is shaped by a Maxwell-Boltzmann distribution, the shaped constellation is equivalently on a straight line. Thus, after projecting the received signal to the line, the calculation of distance between the received signal and the constellation points may be performed on the line. Using the projection (e.g., a pre-processing step for projecting the Rx signal to the line of constellation), in some aspects, may reduce the decoding complexity and may allow existing decoding hardware for non-shaped constellation to be used.

Particular aspects of the subject matter described in this disclosure can be implemented to realize one or more of the following potential advantages. In some examples, by using an input scaling to a channel and received signal prior to performing additional operations associated with a demodulation, the described techniques can be used to reduce a decoding complexity using a decoding hardware for non-shaped constellation decoding.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method, for wireless communication at a decoding device, of decoding a quadrature amplitude modulation (QAM) probabilistically-shaped signal associated with a phase modulation and an amplitude modulation, comprising: receiving, in association with the probabilistically-shaped QAM signal, at least one symbol associated with a first amplitude; and demodulating the at least one symbol based on a distance-based demodulation calculation that is adjusted based on a Maxwell-Boltzmann (MB) distribution.

Aspect 2 the method of aspect 1, further comprising: outputting the demodulated at least one symbol for at least one of local storage or transmission to an additional device.

Aspect 3 the method of any of aspects 1 and 2, wherein the distance-based demodulation calculation comprises calculating a distance between a received symbol and at least one potential demodulated symbol in a set of QAM constellation points, and the method further comprising: adjusting the amplitude of the set of QAM constellation points and adjusting the first amplitude, wherein to calculate the distance between the at least one symbol and the at least one potential demodulated symbol, the at least one processor, individually or in any combination, is configured to use the adjusted amplitude of the set of QAM constellation points and the adjusted first amplitude Aspect 4 the method of aspect 3, wherein the probabilistically-shaped QAM signal comprises a single-layer signal.

Aspect 5 the method of aspect 3, wherein the probabilistically-shaped QAM signal comprises a multiple-layer signal.

Aspect 6 the method of aspect 5, wherein the multiple-layer signal comprises a first number of layers and the set of QAM constellation points comprises the first number of subsets of QAM constellation points corresponding to the first number of layers, wherein adjusting the distance-based demodulation calculation comprises adjusting the amplitude of the set of QAM constellation points, and, wherein calculating the distance between the at least one symbol and the at least one potential demodulated symbol uses the adjusted amplitude of the set of QAM constellation points and the adjusted first amplitude.

Aspect 7 the method of aspect 6, wherein the distance-based demodulation calculation is associated with one of a linear minimum mean square error (LMMSE), a layer-by-layer demodulation calculation, a lattice decoding calculation, or a spherical decoding calculation.

Aspect 8 the method of any of aspects 1 to 7, wherein the probabilistically-shaped QAM signal is a signal shaped based on a MB distribution.

Aspect 9 the method of any of aspects 1 to 7, wherein the probabilistically-shaped QAM signal is a signal shaped based on a non-MB distribution, the method further comprising: determining that the MB distribution is a closest MB distribution to the non-MB distribution.

Aspect 10 is an apparatus for wireless communication at a device including a memory and at least one processor coupled to the memory and, based at least in part on information stored in the memory, the at least one processor is configured to implement any of aspects 1 to 9.

Aspect 11 is the apparatus of aspect 10, further including a transceiver or an antenna coupled to the at least one processor.

Aspect 12 is an apparatus for wireless communication at a device including means for implementing any of aspects 1 to 9.

Aspect 13 is a computer-readable medium (e.g., a non-transitory computer-readable medium) storing computer executable code, where the code when executed by a processor causes the processor to implement any of aspects 1 to 9.

What is claimed is:

1. An apparatus, for wireless communication at a decoding device, for decoding a probabilistically-shaped quadrature amplitude modulation (QAM) signal associated with a phase modulation and an amplitude modulation, comprising:
   at least one memory; and
   at least one processor coupled to the at least one memory and, based at least in part on stored information that is stored in the at least one memory, the at least one processor, individually or in any combination, is configured to:
   receive, in association with the probabilistically-shaped QAM signal, at least one symbol associated with a first amplitude; and
   demodulate the at least one symbol based on a distance-based demodulation calculation that is adjusted based on a Maxwell-Boltzmann (MB) distribution, wherein the distance-based demodulation calculation comprises a calculation of a distance between a received symbol and at least one potential demodulated symbol in a set of QAM constellation points.

2. The apparatus of claim 1, further comprising a transceiver, the at least one processor, individually or in any combination, further configured to:
   output the demodulated at least one symbol for at least one of local storage or transmission to an additional device via the transceiver.

3. The apparatus of claim 1, wherein the at least one processor, individually or in any combination, is further configured to:

adjust the amplitude of the set of QAM constellation points; and adjust the first amplitude, wherein to calculate the distance between the at least one symbol and the at least one potential demodulated symbol, the at least one processor, individually or in any combination, is configured to use the adjusted amplitude of the set of QAM constellation points and the adjusted first amplitude.

4. The apparatus of claim 3, wherein the probabilistically-shaped QAM signal comprises a single-layer signal.

5. The apparatus of claim 3, wherein the probabilistically-shaped QAM signal comprises a multiple-layer signal.

6. The apparatus of claim 5, wherein the multiple-layer signal comprises a first number of layers and the set of QAM constellation points comprises the first number of subsets of QAM constellation points corresponding to the first number of layers, wherein to adjust the distance-based demodulation calculation the at least one processor, individually or in any combination, is configured to adjust the amplitude of the set of QAM constellation points, and wherein to calculate the distance between the at least one symbol and the at least one potential demodulated symbol, the at least one processor, individually or in any combination, is configured to use the adjusted amplitude of the set of QAM constellation points and the adjusted first amplitude.

7. The apparatus of claim 6, wherein the distance-based demodulation calculation is associated with one of a linear minimum mean square error (LMMSE), a layer-by-layer demodulation calculation, a lattice decoding calculation, or a spherical decoding calculation.

8. The apparatus of claim 1, wherein the probabilistically-shaped QAM signal is a signal shaped based on a MB distribution.

9. The apparatus of claim 1, wherein the probabilistically-shaped QAM signal is a signal shaped based on a non-MB distribution, and the at least one processor, individually or in any combination, is configured to:

determine that the MB distribution is a closest MB distribution to the non-MB distribution.

10. A method, for wireless communication at a decoding device, of decoding a probabilistically-shaped quadrature amplitude modulation (QAM) signal associated with a phase modulation and an amplitude modulation, comprising:

receiving, in association with the probabilistically-shaped QAM signal, at least one symbol associated with a first amplitude; and demodulating the at least one symbol based on a distance-based demodulation calculation that is adjusted based on a Maxwell Boltzmann (MB) distribution, wherein the distance-based demodulation calculation comprises calculating a distance between a received symbol and at least one potential demodulated symbol in a set of QAM constellation points.

11. The method of claim 10, further comprising:

outputting the demodulated at least one symbol for at least one of local storage or transmission to an additional device.

12. The method of claim 10, the method further comprising:

adjusting the amplitude of the set of QAM constellation points; and adjusting the first amplitude and wherein calculating the distance between the at least one symbol and the at least one potential demodulated symbol uses the adjusted amplitude of the set of QAM constellation points and the adjusted first amplitude.

13. The method of claim 12, wherein the probabilistically-shaped QAM signal comprises a single-layer signal.

14. The method of claim 12, wherein the probabilistically-shaped QAM signal comprises a multiple-layer signal.

15. The method of claim 14, wherein the multiple-layer signal comprises a first number of layers and the set of QAM constellation points comprises the first number of subsets of QAM constellation points corresponding to the first number of layers, wherein adjusting the distance-based demodulation calculation comprises adjusting the amplitude of the set of QAM constellation points, and, wherein calculating the distance between the at least one symbol and the at least one potential demodulated symbol uses the adjusted amplitude of the set of QAM constellation points and the adjusted first amplitude.

16. The method of claim 15, wherein the distance-based demodulation calculation is associated with one of a linear minimum mean square error (LMMSE), a layer-by-layer demodulation calculation, a lattice decoding calculation, or a spherical decoding calculation.

17. The method of claim 10, wherein the probabilistically-shaped QAM signal is a signal shaped based on a MB distribution.

18. The method of claim 10, wherein the probabilistically-shaped QAM signal is a signal shaped based on a non-MB distribution, the method further comprising: determining that the MB distribution is a closest MB distribution to the non-MB distribution.

19. An apparatus for wireless communication at a decoding device, of decoding a probabilistically-shaped quadrature amplitude modulation (QAM) signal associated with a phase modulation and an amplitude modulation, comprising:

means for receiving, in association with the probabilistically-shaped QAM signal, at least one symbol associated with a first amplitude; and means for demodulating the at least one symbol based on a distance-based demodulation calculation that is adjusted based on a Maxwell Boltzmann (MB) distribution, wherein the distance-based demodulation calculation comprises a calculation of a distance between a received symbol and at least one potential demodulated symbol in a set of QAM constellation points.

20. The apparatus of claim 19, further comprising a transceiver, further comprising:

means for outputting the demodulated at least one symbol for at least one of local storage or transmission to an additional device via the transceiver.

21. The apparatus of claim 19, the apparatus further comprising:

means for adjusting the amplitude of the set of QAM constellation points; and means for adjusting the first amplitude, wherein calculating the distance between the at least one symbol and the at least one potential demodulated symbol uses the adjusted amplitude of the set of QAM constellation points and the adjusted first amplitude.

22. The apparatus of claim 21, wherein the probabilistically-shaped QAM signal comprises a single-layer signal.

23. The apparatus of claim 21, wherein the probabilistically-shaped QAM signal comprises a multiple-layer signal.

24. The apparatus of claim 23, wherein the multiple-layer signal comprises a first number of layers and the set of QAM constellation points comprises the first number of subsets of QAM constellation points corresponding to the first number of layers, wherein the means for adjusting the distance-based demodulation calculation comprises means for adjusting the amplitude of the set of QAM constellation points, and, wherein calculating the distance between the at least one symbol and the at least one potential demodulated symbol uses the adjusted amplitude of the set of QAM constellation points and the adjusted first amplitude.

25. The apparatus of claim 24, wherein the distance-based demodulation calculation is associated with one of a linear minimum mean square error (LMMSE), a layer-by-layer demodulation calculation, a lattice decoding calculation, or a spherical decoding calculation.

26. The apparatus of claim 19, wherein the probabilistically-shaped QAM signal is a signal shaped based on a MB distribution, the apparatus further comprising: means for determining that the MB distribution is a closest MB distribution to the non-MB distribution.

27. The apparatus of claim 19, wherein the probabilistically-shaped QAM signal is a signal shaped based on a non-MB distribution.

28. A non-transitory computer-readable medium storing computer executable code for decoding a probabilistically-shaped quadrature amplitude modulation (QAM) signal associated with a phase modulation and an amplitude modulation at a decoding device, the code when executed by at least one processor causes the decoding device to:

receive, in association with the probabilistically-shaped QAM signal, at least one symbol associated with a first amplitude; and demodulate the at least one symbol based on a distance-based demodulation calculation that is adjusted based on a Maxwell-Boltzmann (MB) distribution, wherein the distance-based demodulation calculation comprises a calculation of a distance between a received symbol and at least one potential demodulated symbol in a set of QAM constellation points.

29. The non-transitory computer-readable medium of claim 28, the code when executed by the at least one processor causes the decoding device to:

output the demodulated at least one symbol for at least one of local storage or transmission to an additional device.

30. The non-transitory computer-readable medium of claim 28, the code when executed by the at least one processor causes the decoding device to:

adjust the amplitude of the set of QAM constellation points; and adjust the first amplitude, wherein to calculate the distance between the at least one symbol and the at least one potential demodulated symbol, the code when executed by the at least one processor causes the decoding device to use the adjusted amplitude of the set of QAM constellation points and the adjusted first amplitude.

* * * * *